United States Patent
Hughes et al.

(10) Patent No.: US 10,087,530 B2
(45) Date of Patent: Oct. 2, 2018

(54) CORROSION INHIBITION

(71) Applicant: SCHLUMBERGER TECHNOLOGY CORPORATION, Sugar Land, TX (US)

(72) Inventors: Trevor Hughes, Cambridge (GB); Evgeny Barmatov, Cambridge (GB); Bruno Drochon, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 169 days.

(21) Appl. No.: 14/772,634

(22) PCT Filed: Feb. 21, 2014

(86) PCT No.: PCT/IB2014/059164
§ 371 (c)(1),
(2) Date: Sep. 3, 2015

(87) PCT Pub. No.: WO2014/136012
PCT Pub. Date: Sep. 12, 2014

(65) Prior Publication Data
US 2016/0010217 A1    Jan. 14, 2016

Related U.S. Application Data

(60) Provisional application No. 61/772,477, filed on Mar. 4, 2013.

(51) Int. Cl.
*C23F 11/04* (2006.01)
*C09K 8/54* (2006.01)
(Continued)

(52) U.S. Cl.
CPC ............ *C23F 11/04* (2013.01); *C09K 8/54* (2013.01); *C09K 8/72* (2013.01); *C23C 30/00* (2013.01); *C09K 2208/32* (2013.01)

(58) Field of Classification Search
None
See application file for complete search history.

(56) References Cited

U.S. PATENT DOCUMENTS 3,773,465 A    11/1973  Keeney et al.
4,401,587 A *  8/1983  Boffardi .............. C23F 11/10
                                                        106/14.12
(Continued)

FOREIGN PATENT DOCUMENTS

EP    0527278 A1    2/1993
JP    2000219980 A    8/2000
WO   WO2005123981 A1    12/2005

OTHER PUBLICATIONS

Stern, M. et al., "Electrochemical Polarization: I. A Theoretical Analysis of the Shape of Polarization Curves" in Journal of Electrochemical Society, 1957, 104(1), pp. 56-63.
(Continued)

*Primary Examiner* — Shamim Ahmed
*Assistant Examiner* — Bradford M Gates

(57) ABSTRACT

Corrosion of steel by aqueous acidic solution when treating a wellbore with acid is inhibited by a procedure in which the steel is initially exposed to a first aqueous solution containing one or more corrosion inhibiting constituents which provide both corrosion inhibitor and hydrophobic liquid and deposit a corrosion inhibiting film on the steel surface and then exposed to an acidic second aqueous solution containing one or more such corrosion inhibiting constituents at a lower concentration. During this second period, the lower concentration of corrosion inhibiting constituents in the second aqueous solution maintains the film already established on the steel surface. Weight loss through corrosion in the second stage is lower than the weight loss which otherwise would be observed. Overall there can be reduction of both weight loss and consumption of corrosion inhibitor.

22 Claims, 9 Drawing Sheets

(51) Int. Cl.
C09K 8/72 (2006.01)
C23C 30/00 (2006.01)

(56) References Cited

U.S. PATENT DOCUMENTS

| | | | |
|---|---|---|---|
| 4,498,997 A | 2/1985 | Walker | |
| 5,120,471 A | 6/1992 | Jasinski et al. | |
| 5,209,859 A | 5/1993 | Williams et al. | |
| 2007/0017602 A1* | 1/2007 | Koch | C23C 22/34 |
| | | | 148/247 |
| 2009/0221455 A1* | 9/2009 | Ke | C09K 8/54 |
| | | | 507/261 |
| 2011/0224111 A1 | 9/2011 | Gupta et al. | |

OTHER PUBLICATIONS

Stern, M., "A Method for Determining Corrosion Rates From Linear Polarization Data", Corrosion, 1958, 14(9), pp. 440t-444t.
Search Report and Written Opinion of International Application No. PCT/IB2014/059164 dated Jun. 3, 2014, 10 pages.

* cited by examiner

CORROSION INHIBITION

BACKGROUND

There are numerous circumstances where it is desired to protect steel from corrosion by acidic material to which it is exposed. These include the protection of steel exposed to an aqueous acidic liquid such as when steel tubing is used to convey a flow of aqueous liquid.

One industry which has a need for protection of steel against corrosion is oil and gas exploration and production. Steel tubulars used in a borehole may be exposed to an acidic liquid mixture and so also may steel pipelines used to carry produced oil and gas.

The technique of matrix acidising in which the producing formation is treated with acid to stimulate production involves deliberate exposure of borehole steel to acid. This operation may be performed with coiled tubing which is run into a borehole and then used to convey acid down the borehole to the formation. When the operation comes to an end, the steel casing in the borehole and the exterior of the coiled tubing can be exposed to so-called unspent acid flowing back with formation fluids towards the surface.

A conventional approach to the protection of steel against corrosion by an acidic liquid is to contact the steel with a corrosion inhibitor. For example, when conveying an acidic liquid through steel tubing, it is conventional to add a corrosion inhibitor to the flow of liquid as mentioned in many documents including for example U.S. Pat. Nos. 3,773,465, 4,498,997 and 5,120,471.

Organic inhibitors adsorb on the metal surface. Adsorbed inhibitor(s) may influence the rate of corrosion by one or more of several mechanisms: (i) by forming a physical barrier film which restricts the diffusion of species to/from the metal surface, (ii) by blocking anodic and/or cathodic reaction sites directly, (iii) by interacting with corrosion reaction intermediates adsorbed on the surface and (iv) by influencing the electrical double layer that forms at the metal/solution interface.

Adsorption may be physi-sorption which is the result of electrostatic attractive forces between inhibiting organic ions or dipoles and the electrically charged surface of the metal. The surface charge of the metal is due to the electric field at the outer Helmholtz plane of the electrical double layer existing at the metal/solution interface.

Another possibility is that adsorption is by chemi-sorption, which takes place more slowly than electrostatic adsorption and with a higher activation energy. Chemi-sorption involves electron transfer from electron-rich sites within the structure of the inhibitor molecule(s) to vacant low energy orbitals in the metal. Typically, such electron-rich sites within an inhibitor molecule are heteroatoms with lone pair(s) of electrons or are multiple bonds and aromatic rings so that covalent bonds have electrons in $\pi$-orbitals. Because activation energy is required, to bring about chemi-sorption, the extent of chemi-sorption and therefore the efficacy of corrosion inhibition may increase with temperature. It is known that chemi-sorbed acetylenic compounds can react to form polymeric inhibitor films. Such reaction/polymerisation is surface-catalysed.

As illustrated by the US patents mentioned above, corrosion inhibitors are frequently marketed as a mixture containing materials which inhibit corrosion and other materials which enhance inhibition, even though these other materials do not function as corrosion inhibitors (or are less efficacious) if used alone. In some cases these mixtures are proprietary and their exact composition is not made public.

A mixture which contains a chemi-sorbing corrosion inhibitor may also include non-ionic or cationic surfactants to assist deposition on steel, quaternary nitrogen compounds, amines (which will protonate to quaternary nitrogen under acidic conditions) and organic solvent. Some oilfield corrosion inhibitor products considered to provide good inhibition performance at high temperatures are mixtures which make use of a synergistic combination of an amine and an acetylenic alcohol.

Materials used in a corrosion inhibiting mixture may include materials which are considered to damage an oil reservoir by depositing on the reservoir formation. In particular surfactants in a corrosion inhibiting mixture may assist deposition of corrosion inhibitor on steel, yet be regarded as potentially reducing production from a reservoir. Consequently there is a conflict between a desire to protect steel tubing by means of inhibitor compositions and a desire to protect the reservoir from exposure to such inhibitor compositions.

The corrosion inhibiting effect of an inhibitor or corrosion inhibiting mixture can be tested in various ways. One direct method of testing is to use a test piece which is a sample of the steel to be protected, customarily referred to as a "coupon". This coupon is exposed for a measured length of time to an acidic solution containing a known concentration of corrosion inhibitor. The loss in weight of the coupon is measured and expressed as weight loss per unit surface area. The coupon is also examined for localised pitting and the extent of pitting may be expressed as a numerical value: the so-called pitting index.

There are a number of other ways to measure corrosion by an acidic solution. These include linear polarization resistance measurement which was first proposed by M Stern and A L Geary in "Electrochemical Polarization: I. A Theoretical Analysis of the Shape of Polarization Curves" in J. Electrochem. Soc. Vol 104 pp 56-63 (1957) and followed by Stern: "A Method For Determining Corrosion Rates From Linear Polarization Data" in Corrosion, Vol. 14, No. 9, 1958, pages 440t-444t. In such tests a piece of the steel is used as an electrode and this electrode may be kept moving as a rotating disc, cylinder or cage to simulate flow of the corrosive solution over the steel.

When steel is going to be exposed to a flow of an acidic composition, it is normal practice to test coupons of the steel with various concentrations of corrosion inhibitor in samples of the acidic composition. A concentration of inhibitor which produces an acceptably low weight loss and pitting index is identified and this concentration of inhibitor is then maintained in the flow of acidic composition to which the steel is exposed.

SUMMARY

This summary is provided to introduce a selection of concepts that are further described below. This summary is not intended to be used as an aid in limiting the scope of the subject matter claimed.

We have now found that with certain corrosion inhibitors and corrosion inhibiting mixtures, it is not necessary to maintain a uniform concentration in the acidic solution throughout the period of exposure, and that a better result can be achieved by employing at least two stages with a quantitative or qualitative change to the inhibitor or inhibiting mixture and/or the concentration thereof between one stage and the next.

In a first aspect of this disclosure, a method of inhibiting corrosion of steel when exposed to aqueous acid in the course of acidic treatment of a wellbore comprises exposing the steel for a first period of time to a first aqueous solution containing at least one corrosion inhibitor or corrosion inhibiting mixture which deposits a hydrophobic corrosion inhibiting film on the steel surface, then during a subsequent second period of time exposing the steel to an acidic second solution containing at least one corrosion inhibitor or inhibitor mixture with a lower concentration of corrosion inhibitor or inhibiting mixture in the second solution than in the first solution.

By formulating the composition used in the first solution such that it establishes a hydrophobic film which persists on the steel surface, it becomes possible to use a concentration of corrosion inhibitor or inhibiting mixture in the acidic second solution which is less than in the first solution but which maintains the film of inhibitor on the steel surface. In consequence the weight loss through corrosion in the second period of time is lower than the weight loss which would be observed with the same second solution if the treatment with the first solution during the first period of time had not taken place.

The overall loss of weight from steel or the overall consumption of corrosion inhibiting compounds or both of these, can be less than if the corrosion inhibiting compound(s) are kept at a constant concentration throughout.

The term "corrosion inhibitor" is used here to refer to chemical compounds which reduce the rate of corrosion of steel when added to a solution of a mineral acid, such as hydrochloric acid, with no other corrosion inhibitor present. Each solution may contain a corrosion inhibiting mixture in which at least one corrosion inhibitor is accompanied by one or more materials which is not itself a corrosion inhibitor but enhances the action of the corrosion inhibitor. Corrosion inhibitors may be water-soluble (for example propargyl alcohol) or water-insoluble (for example a long chain acetylenic alcohol). Organic materials which enhance the action of a corrosion inhibitor may be water-insoluble. More specifically, a corrosion inhibiting mixture may contain a water-insoluble amine or cationic surfactant (both of which may be aromatic) or a water-insoluble liquid which may be a hydrocarbon oil or an ester.

The first aqueous solution may contain a corrosion inhibitor and a separate water-insoluble hydrophobic liquid which is not itself a corrosion inhibitor. Alternatively, the function of such materials may be met by a compound which is corrosion inhibitor and is a water-insoluble liquid.

The corrosion inhibitors in the first and second solutions may be different compounds but both may have a molecular structure with covalent π-bonds or with lone pair electrons, so that they can chemi-sorb to a steel surface.

Water-insoluble materials in the first and second solutions may be suspended in the aqueous solution, may be accompanied by emulsifier or surfactant, which may be cationic or non-ionic, so as to be present in dispersed droplets or surfactant micelles, or may be accompanied by an organic solvent which is water soluble.

In some embodiments, a corrosion inhibiting mixture may contain nitrogen-free corrosion inhibitor and nitrogen-free water-insoluble hydrophobic liquid in an amount which is greater than (possibly more than three times the amount of) any cationic surfactants and organic amines. It may also be possible to avoid completely any cationic surfactants and organic amines.

DETAILED DESCRIPTION

Figure 1:
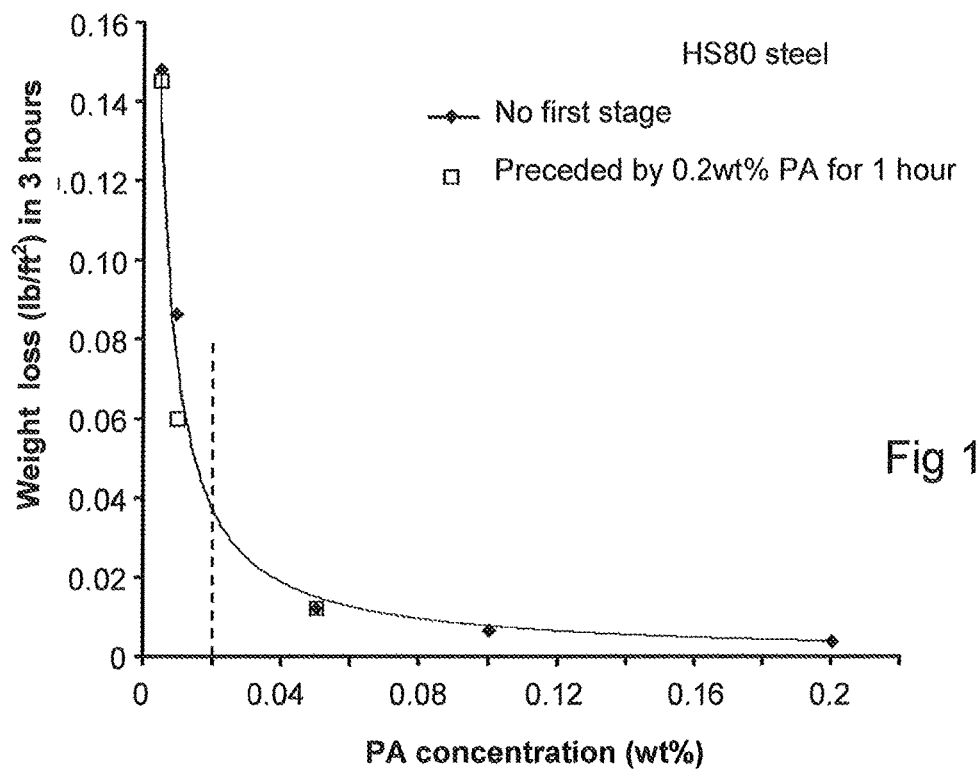
FIG. 1 is a graph showing weight-loss from HS80 steel plotted (on a linear scale) against concentration of propargyl alcohol, without any first stage as referred to in Example 1 and also after a first stage with propargyl alcohol as in Example 2.

In some aspects of the method disclosed here, steel to be protected from corrosion is exposed, during a first period of time to a first aqueous solution containing one or more corrosion inhibiting constituents selected from corrosion inhibitors able to adsorb to a steel surface, water-insoluble amines, cationic surfactants, non-ionic surfactants and water-insoluble hydrophobic liquids such that the corrosion inhibiting constituents provide at least corrosion inhibitor and hydrophobic liquid and deposit a corrosion inhibiting film on the steel surface and then exposed during a second period of time to an acidic second aqueous solution containing one or more corrosion inhibiting constituents also selected from corrosion inhibitors able to adsorb to a steel surface, water-insoluble amines, cationic surfactants, non-ionic surfactants, and water-insoluble hydrophobic liquids.

This first solution may possibly be acidic. It contains at least one corrosion inhibitor which chemi-sorbs to the steel surface and contains hydrophobic liquid which deposits on the steel surface. However, the corrosion inhibitor and hydrophobic liquid may possibly be both provided by a corrosion inhibitor which is hydrophobic and liquid.

If the hydrophobic liquid is not itself a corrosion inhibitor it may be an oil such as a hydrocarbon oil or a water insoluble ester, such as an ester of an acid containing at least 8 carbon atoms or of an alcohol containing at least 8 carbon atoms. This hydrophobic liquid may have a boiling temperature, at atmospheric pressure, of at least 100° C.

The corrosion inhibitor may have a molecular structure with at least one unsaturated group so that it has at least one covalent π-bond enabling the inhibitor molecule to chemi-sorb to the steel surface. The inhibitor may then be an unsaturated compound which polymerises on a steel surface. Compounds which can polymerise on a steel surface include cinnamaldehyde and homologues (in which an olefinic double bond is conjugated with both an aromatic ring and an aldehyde group), α-alkenyl phenones (in which the keto group is conjugated with an aromatic ring and an olefinic double bond in the alkenyl group and acetylenic alcohols. If the corrosion inhibiting constituents include a separate hydrophobic liquid, the corrosion inhibitor may be water soluble, for instance propargyl alcohol. If the corrosion inhibitor is itself hydrophobic, it may be an acetylenic alcohol which is liquid at atmospheric pressure and has a structure containing at least 6 carbons atoms, and possibly from 6 or 8 to 18 carbon atoms. When acetylenic compounds form a corrosion protecting film on a steel surface, the triple bond enables them to chemi-sorb, after which they polymerise on the surface.

Another possibility is that the corrosion inhibitor may have a structure which incorporates lone pair electrons on nitrogen, able to participate in chemi-sorption, or may incorporate quaternary nitrogen.

Corrosion inhibitor which chemi-sorbs to the steel surface may be included in the first solution at a concentration of at least 0.1 wt % and possibly in higher amounts such as up to 5 wt %, 10 wt % or even 15 wt % of an aqueous solution, especially when being used at high temperatures. In some embodiments the concentration may be not more than 3 wt % and possibly not more than 1 wt %. A hydrophobic liquid which is not itself a corrosion inhibitor may be included at a concentration of at least 0.1, 0.2 or 0.5 wt % up to 5 wt %, 10 wt % or 15 wt % although possibly not more than 1 or 2 wt %.

This first solution may contain surfactant, which may be a water insoluble cationic surfactant and the concentration of cationic surfactant (if present) may lie in a range from 0.1 up to 1 or 2 wt %.

Exposure of the steel to the first solution may be carried out as part of a process which is more than an anti-corrosion treatment. The duration of exposure to the first solution (i.e. the first time period) may be determined by requirements of the overall process. However it may well be that the first period of time is at least 5 min and not longer than 90 min. During this first period of time the first solution may be made to flow over the steel, for example if the first solution is being pumped through steel tubing, or it may be allowed to become stationary in contact with the steel for example by pumping the solution into contact with the steel and then stopping the pump for a time, so that the solution remains in stationary contact with the steel.

After the first period of time, the steel is exposed during a second period of time to a second solution which is acidic. This also contains at least one corrosion inhibiting constituent. This may be a corrosion inhibitor that is able to adsorb onto steel. If so, this corrosion inhibitor can be at a lower concentration then in the first solution. We have found that after a protective film has been established during the first period time, a much lower concentration of corrosion inhibitor or inhibiting mixture can maintain the persistence of the protective film.

The corrosion inhibitor used during the second period of time may be a compound with lone pair electrons or a covalent πbond, so that it too can chemi-sorb to steel. It may be a compound which is able to polymerise on steel, such as an acetylenic alcohol, as is possible in the first period of time, but it does not need to be the same as the corrosion inhibitor used during the first period of time. For example, if a water-insoluble hydrophobic corrosion inhibitor is used during the first period of time, it is possible that the corrosion inhibitor in this second solution will be a water soluble corrosion inhibitor such as propargyl alcohol.

Concentration of corrosion inhibitor in the second solution may be very low, and it may possibly lie in a range from 0.02 wt % up to 0.1 wt %.

The corrosion inhibitor or inhibiting constituents used in the second solution may be qualitatively the same as in the first solution, but at a lower concentration. However, it is also possible that the composition used in the second period is qualitatively different from that in the first period. The corrosion inhibiting constituents included in the second aqueous solution may or may not contain a hydrophobic liquid. We have found that it is not necessary to include a hydrophobic oil in this second aqueous solution, but there is also no necessity to exclude hydrophobic oil from second solution. Somewhat similarly, the second solution may contain some surfactant but it does not need to do so.

It will thus be appreciated that the second solution may contain a lower concentration of corrosion inhibiting mixture than the first solution and a lower concentration of corrosion inhibitor than the first solution. However, it is also possible that the first and second solutions contain similar concentrations of corrosion inhibitor but the second solution contains a lower concentration of other corrosion inhibiting constituents than the first solution. Such a situation could arise if the first solution contains a corrosion inhibiting mixture in which there is a high proportion of hydrophobic oil while the second solution contains corrosion inhibitor with little or no oil.

In some embodiments, the concentration of corrosion inhibiting constituents which are corrosion inhibitors or hydrophobic liquids present in the second solution may be not more than half or not more than one quarter the concentration of such materials in the first solution.

If the second solution is a matrix acidising solution, it is envisaged that the second solution may not contain surfactant. The quantity of cationic surfactant(s) in the second solution may well be less than 1 wt % and possibly less than 0.1 wt %.

The second solution may be brought into contact with the steel directly after the contact with the first solution which took place during the first period of time. Indeed, it may be convenient for the second solution to be used to displace the first solution. However, it is possible that there will be an intermediate period as an interval between the first and second periods of time and during this interval the steel could possibly be contacted by an acidic solution which does not contain corrosion inhibitor. Plainly during such an interval there would be nothing to maintain the film which has been established on steel, but we have observed that a film established on steel does not disappear immediately even in the absence of any maintenance concentration of corrosion inhibitor.

The concentration of acid in the second solution may well be 1 molar or more. The first solution may be acidic and it may have an acid concentration of at least 0.1 molar or at least 1 molar. The acid concentration in both solutions may lie in a range from 1 to 10 molar. The acid may be hydrochloric, especially when used in subterranean reservoir treatment.

Because the present process calls for steel to be exposed to two solutions in succession, the process is likely to be useful in a context where the steel is exposed to flow of an acidic aqueous solution. This could for example arise when steel tubing is used to provide a pipeline for transport of an acidic solution.

Specifically the invention may be utilised in the context of operations where an acidic solution is passed into a well bore through coiled tubing, as occurs in the context of matrix acidising when acid is delivered through coiled tubing to pass out of the wellbore into the surrounding geological formation. In this case the first solution can deposit a corrosion protecting film on the inside of the coiled tubing to protect it during the second period of time during which acid is pumped through the tubing to go out into the formation around the wellbore. In a development, the second period of time is followed by a third period of time during which a solution with an increased concentration of corrosion inhibitor or corrosion inhibiting mixture is pumped down through the coiled tubing so that this third solution will deposit a protective film on the interior of the fixed wellbore tubing and the exterior of the coiled tubing at the beginning of the flow-back stage when these surfaces are contacted by aqueous solution, (which may still be acid) flowing back from the formation.

The presence of a film on steel can be checked experimentally using test pieces. After exposure of a steel test piece to a solution containing one or more corrosion inhibiting constituents the test piece is washed with demineralized water and allowed to dry. The film is then dissolved by immersing the test piece in an organic solvent and the resulting solution is analysed for corrosion inhibiting materials.

The formation of a film and its efficacy when maintained by a low concentration of inhibitor will now be shown by the following experimental Examples. The first group of experiments (Examples 1 to 12) were carried out observing weight loss in a manner similar to conventional corrosion tests. Steel corrosion test coupons with surface area of 25-30 cm$^2$ were glass bead blasted to ensure a clean surface, measured to determine their exact surface area, weighed and then exposed to acidic solutions in a well stirred corrosion cell containing 200 mL fluid per test coupon. The temperature was held at 78° C. A number of these tests involved exposure to a first fluid solution for a period of time, after which this solution was removed and replaced with a second fluid solution for a longer time. Care was taken that the second fluid solution was not contaminated with traces of the first solution. For this reason, when a coupon was removed from the first solution it was washed off with a small quantity of the second solution (and the washings discarded) before being placed in the second solution in the corrosion cell.

The various steels used in these tests were:
HS80, a low carbon steel used to fabricate coiled tubing.
N80, a medium carbon steel used to fabricate casing.
13Cr80, a common metal alloy also used to fabricate casing.
All three of these steels have yield strength of about 80 kpsi.

A number of these examples demonstrate that, in some embodiments, the two stage approach disclosed here can lead to a weight loss per unit area in the second stage which is at least 10 times less after a first stage pretreatment than the weight loss per unit area if the first stage pretreatment is omitted. In some instances the weight loss per unit area is lower by at least 20, 40 and even 100 times.

EXAMPLE 1

A first series of tests was carried out exposing the low carbon HS80 steel to 4 molar hydrochloric acid containing propargyl alcohol (2-propyn-1-ol) in concentrations from 0.005-0.20 wt %. In each experiment there was exposure for a period of three hours. The results are shown in the following table and are plotted as weight loss against propargyl alcohol concentration in FIG. 1, with the points represented as diamonds. As will be mentioned in Example 4 below, the same results are also plotted in FIG. 2, with weight loss on a logarithmic scale.

TABLE 1

| Propargyl alcohol (wt %) | Weight loss over three hours | |
|---|---|---|
| | lb/ft2 | gm/m2 |
| 0.005 | 0.148 | 723 |
| 0.01 | 0.069 | 419 |
| 0.05 | 0.012 | 59 |
| 0.10 | 0.0069 | 34 |
| 0.20 | 0.0041 | 20 |

Most of the above results are an average of two replicate tests but in the case of 0.20 wt % propargyl alcohol, eight replicate tests were carried out and indicate a mean value of 0.0041 lb/ft$^2$, a population standard deviation, $\sigma_x$=0.000386 lb/ft$^2$ and a relative standard deviation, RSD=9.4%.

As can be seen from the numbers in the table and from the graph in FIG. 1, the weight loss decreases very considerably from 0.148 lb/ft$^2$ in the presence of 0.005 wt % propargyl alcohol to 0.0041 lb/ft$^2$ in the presence of 0.20 wt % propargyl alcohol. By reading from FIG. 1 it would be seen that a concentration of 0.02 wt % (shown by a dashed vertical line) is the minimum propargyl alcohol concentration required to achieve a cumulative weight loss of not more than 0.05 lb/ft$^2$ (244 g/m$^2$) over three hours exposure, which is frequently regarded as the maximum acceptable in the course of a matrix acidizing job.

EXAMPLE 2

Further tests were also carried out using the same apparatus and temperature and again using coupons of HS80 steel. Coupons were exposed to acid in two exposure stages. The first stage was carried out using a first fluid solution which was 4 molar hydrochloric acid containing 0.20 wt % propargyl alcohol with an exposure time of one hour, after which weight loss was measured. In a second stage, the coupons were exposed to a second fluid solution which was 4 molar hydrochloric acid containing various concentrations of propargyl alcohol, for three hours.

The weight loss observed in the one hour first stage was $0.0027 \pm 0.0001$ lbs/ft$^2$ ($13 \pm 0.5$ gm/m$^2$). Weight losses observed in the three hour second stage are given in the following table:

TABLE 2

| Propargyl alcohol concentration | Weight loss over three hours | |
|---|---|---|
| in second stage (wt %) | lbs/ft$^2$ | gm/m$^2$ |
| none | 0.335 | 1636 |
| 0.005 | 0.143 | 698 |
| 0.01 | 0.060 (mean of two tests) | 293 |
| 0.05 | 0.012 (mean of two tests) | 59 |

These results are plotted as open squares in FIG. 1 and, when compared with those from Example 1, show that the weight loss during the second stage in Example 2 is very similar to the weight loss with the same propargyl alcohol concentration in Example 1. Thus this Example 2 shows that a first stage of one hour with a higher concentration of propargyl alcohol has no appreciable effect on corrosion in the second stage.

EXAMPLE 3

Another series of tests was carried out, using the same procedure and the same HS80 grade steel as in Example 2. The first fluid solution was 4 molar hydrochloric acid containing various corrosion inhibiting constituents. The solution used for the three hour second stage was 4 molar hydrochloric acid containing propargyl alcohol at a concentration of either 0.005 wt % or 0.01 wt %.

Materials used in the first stage (and abbreviations for them) were

Propargyl alcohol (PA)

Dodecyl pyridinium chloride (DPC) which is a cationic surfactant

Methyl oleate (MO) which is a water-insoluble oily ester.

The results are given in the following table which repeats some figures from Example 2 to facilitate comparison

TABLE 3

| | First stage (1 hour) | | Second stage (3 hours) | | |
|---|---|---|---|---|---|
| | Weight loss | | PA | Weight loss | |
| Materials | lb/ft$^2$ | gm/m$^2$ | (wt %) | lb/ft$^2$ | gm/m$^2$ |
| 1 0.2 wt % PA | 0.0027 | 13.2 | none | 0.335 | 1636 |
| 2 | | | 0.005 | 0.143 | 698 |
| 3 | | | 0.01 | 0.060 | 293 |
| 4 2 wt % PA | 0.0010 | 4.9 | none | 0.356 | 1738 |
| 5 | | | 0.005 | 0.154 | 752 |
| 6 0.2 wt % PA + | 0.0022 | 10.7 | 0.005 | 0.112 | 547 |
| 7 0.1 wt % DPC + | | | 0.01 | 0.041 | 200 |
| 0.1 wt % MO | | | | | |
| 8 0.2 wt % 4-ethyl 1- | 0.0012 | 5.9 | none | 0.327 | 1597 |
| 9 octyn-3-ol + 0.1 | | | 0.005 | 0.152 | 742 |
| wt % DPC | | | | | |
| 10 0.2 wt % 1-octyn-3- | 0.0004 | 1.9 | 0.005 | 0.0051 | 25 |
| 11 ol + 0.1 wt % | | | 0.01 | 0.0035 | 17 |
| DPC + 0.1 wt % | | | | | |
| MO | | | | | |
| 12 0.2 wt % 4-ethyl 1- | 0.0010 | 4.9 | 0.005 | 0.010 | 49 |
| 13 octyn-3-ol + 0.1 | | | 0.01 | 0.002 | 9.8 |
| wt % DPC + 0.1 | | | | | |
| wt % MO | | | | | |

Comparison of row 6 with row 2 and row 7 with row 3 shows that inclusion of 0.1 wt % DPC and 0.1 wt % MO in the first stage fluid leads to little or no reduction of corrosion in the second stage. However, comparison of rows 10 and 12 with rows 6 and 2 and likewise comparison of rows 11 and 13 with rows 7 and 3 shows that changing from propargyl alcohol which is water soluble to 1-octyn-3-ol or 4-ethyl 1-octyn-3-ol, both of which are water insoluble, leads to a dramatic reduction in the amount of corrosion during the second stage provided that 0.1 wt % DPC and 0.1 wt % MO are included in the first stage. This demonstrates that the low concentration of propargyl alcohol present during the second stage is maintaining a corrosion protecting film established in the first stage.

EXAMPLE 4

A series of tests was carried out using similar procedure to Example 1 above. The steel was again HS 80. The steel coupons were exposed for three hours to 4 molar hydrochloric acid containing various concentrations of a corrosion inhibiting mixture denoted CI/1 which contained 7% propargyl alcohol, 60% hydrocarbon oily phase and 33% methanol.

The results are shown in the following table and are plotted as weight loss against CI/1 concentration in FIG. 2, in which the weight loss is on a logarithmic scale, the data points from this Example are plotted as open circles and the data points from Example 1 are plotted as diamonds.

TABLE 4

| | Weight loss over three hours | |
|---|---|---|
| CI/1 (wt %) | lb/ft$^2$ | gm/m$^2$ |
| 0.001 | 0.418 | 2040 |
| 0.003 | 0.0356 | 173 |
| 0.05 | 0.0087 | 42 |
| 0.10 | 0.0050 | 24 |
| 0.15 | 0.0041 | 20 |
| 0.20 | 0.0038 | 19 |

Figure 2:
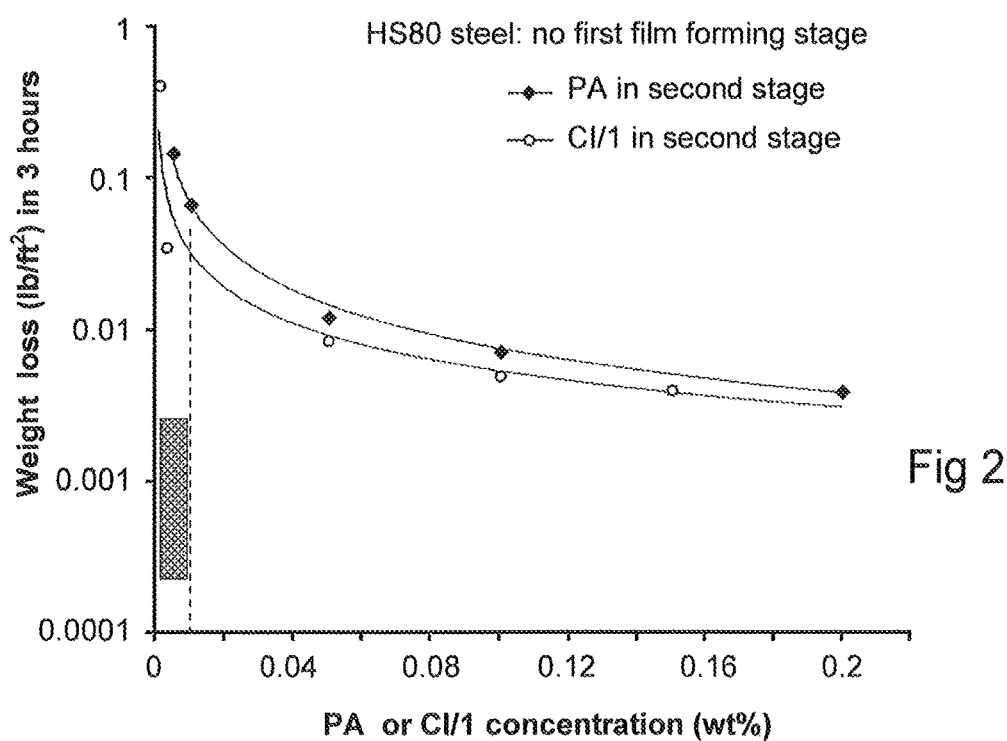
FIG. 2 is a graph showing weight-loss from HS80 steel without any first stage treatment plotted (on a logarithmic scale) against concentrations of propargyl alcohol as referred to in Example 1 and inhibitor CI/1 as referred to in Example 4.

By reading from the curve plotted in FIG. 2, it would be seen that a concentration of about 0.01 wt % (shown by a dashed vertical line) is the minimum concentration of the CI/1 mixture required to achieve a cumulative weight loss of not more than 0.05 lb/ft$^2$ (244 g/m$^2$) over three hours exposure.

EXAMPLE 5

A series of tests was carried out using the procedure of Examples 2 and 3. The steel was again HS 80. The first stage was 1 hour and the first fluid contained the corrosion inhibiting mixture denoted CI/1 at concentrations of 0.2 wt % or 2 wt % in hydrochloric acid at concentrations of 1.4M, 4M and 8.8M. As in Example 3 the fluid for the three hour second stage was 4 molar hydrochloric acid containing propargyl alcohol at a concentration of either 0.005 wt % or 0.01 wt %.

The results are given in the following table:

TABLE 5

| | First stage | | | Second stage (3 hours) | | |
|---|---|---|---|---|---|---|
| | | Weight loss | | Propargyl | Weight loss | |
| | Period (mins) | lb/ft$^2$ | gm/m$^2$ | alcohol (wt %) | lb/ft$^2$ | gm/m$^2$ |
| 1 | none | | | 0.005 | 0.148 | 722 |
| 2 | | | | 0.01 | 0.068 | 420 |
| 3 | 0.2 wt % CI/1 in 4M HCl | 60 | 0.0012 | 5.9 | 0.005 | 0.0012 | 5.9 |
| 4 | | | | | 0.01 | 0.0010 | 4.9 |
| 5 | 0.2 wt % CI/1 in 4M HCl | 15 | 0.0006 | 2.9 | 0.005 | 0.0016 | 7.8 |
| 6 | | | | | 0.01 | 0.0011 | 5.4 |
| 7 | 0.2 wt % CI/1 in 8.8M HCl | 60 | 0.0038 | 19 | 0.005 | 0.0002 | 0.1 |
| 8 | | | | | 0.01 | 0.0003 | 1.5 |
| 9 | 0.2 wt % CI/1 in 1.4M HCl | 60 | 0.0008 | 3.9 | 0.005 | 0.0015 | 7.3 |
| 10 | | | | | 0.01 | 0.0013 | 6.3 |
| 11 | 2 wt % CI/1 in 4M HCl | 60 | 0.0009 | 4.4 | 0.005 | 0.0011 | 5.4 |
| 12 | | | | | 0.01 | 0.0008 | 3.9 |
| 13 | 2 wt % CI/1 in 8.8M HCl | 60 | 0.0017 | 8.3 | 0.005 | 0.0008 | 3.9 |
| 14 | | | | | 0.01 | 0.0008 | 3.9 |

The first two rows in the table above are copied from Example 1 and show the extent of corrosion if the second stage takes place without the first stage. The subsequent rows numbered 3 onwards, where there was a first stage using the CI/1 inhibitor composition, show considerable reduction in the extent of corrosion in the second stage. This demonstrates that a corrosion inhibiting film established with the CI/1 mixture in the first stage is being maintained as an effective corrosion preventing film by a reduced concentration of propargyl alcohol in the second stage.

When the data points for the 3 hour second stage in rows 3 to 14 are plotted in FIG. 2, they appear in the region shown by a shaded box, with very low weight loss at low inhibitor concentration.

The coupons for rows 3 to 14 of the above table were inspected visually and seen to be free or almost free of pitting.

EXAMPLE 6

Further tests were carried out generally as in Example 5, using 0.2 wt % CI/1 in 4 molar hydrochloric acid in a first stage of one hour, followed by an extended second stage of six hours, using a second fluid containing three concentrations of propargyl alcohol in 4 molar hydrochloric acid.

The weight loss observed in the one hour first stage was 0.0012 lbs/ft$^2$ (5.9 gm/m$^2$) as in Example 5. The following table shows weight losses observed in this six hour second stage and for comparison also repeats data from Example 5 where the second stage was three hours.

TABLE 6

| | Propargyl alcohol concentration during second stage (wt %) | Duration of second stage (hours) | Weight loss during second stage | |
|---|---|---|---|---|
| | | | lbs/ft$^2$ | gm/m$^2$ |
| 1 | 0.0025 | 6 | 0.0016 | 7.8 |
| 2 | 0.005 | 3 | 0.0012 | 5.9 |
| 3 | 0.005 | 6 | 0.0014 | 6.8 |
| 4 | 0.01 | 3 | 0.0010 | 4.9 |
| 5 | 0.01 | 6 | 0.0014 | 6.8 |

It can be seen that the corrosion protecting films established in the first stage were sustained for six hours. Moreover, the data for the second stage solutions containing 0.005 and 0.01 wt % propargyl alcohol indicate that the weight loss during the second three hours of the second stage was only 0.0002-0.0004 lb/ft$^2$ compared to 0.001-0.0012 lb/ft$^2$ during the first three hours. That suggests that the inhibition efficiency of the film increases with time during the second stage.

EXAMPLE 7

A series of tests was carried out using the procedure of Example 5. The first stage was 1 hour and fluid used for this first stage contained 0.2 wt % of the corrosion inhibiting mixture denoted CI/1 in 4 molar hydrochloric acid, giving a weight loss of 0.0012 lbs/ft$^2$ (5.9 gm/m$^2$) as in Example 5. The fluid for the three hour second stage was 4 molar hydrochloric acid containing CI/1 at several concentrations.

The results are given in the following table which repeats some results from Example 4 as a comparison:

TABLE 7

| | Second stage (3 hours) | | |
|---|---|---|---|
| | | CI/1 | Weight loss | |
| First stage (1 hour) | (wt %) | lbs/ft$^2$ | gm/m$^2$ |
| None | 0.001 | 0.418 | 2041 |
| | 0.003 | 0.0356 | 174 |
| | 0.05 | 0.0087 | 42 |
| 0.2 wt % CI/1 in 4M HCl | 0.004 | 0.0017 | 8.3 |
| | 0.01 | 0.0015 | 7.3 |

Once again the initial treatment with CI/1 led to a second stage in which a low concentration of CI/1 gave low corrosion by maintaining the film formed in the first stage.

EXAMPLE 8

In this example the steel test pieces were N80 steel. As in Example 1, steel coupons were exposed for 3 hours (with no preceding first stage) to 4 molar hydrochloric acid containing various concentrations of propargyl alcohol. These results are shown graphically in FIG. 3 with the data points shown as diamonds.

Figure 3:
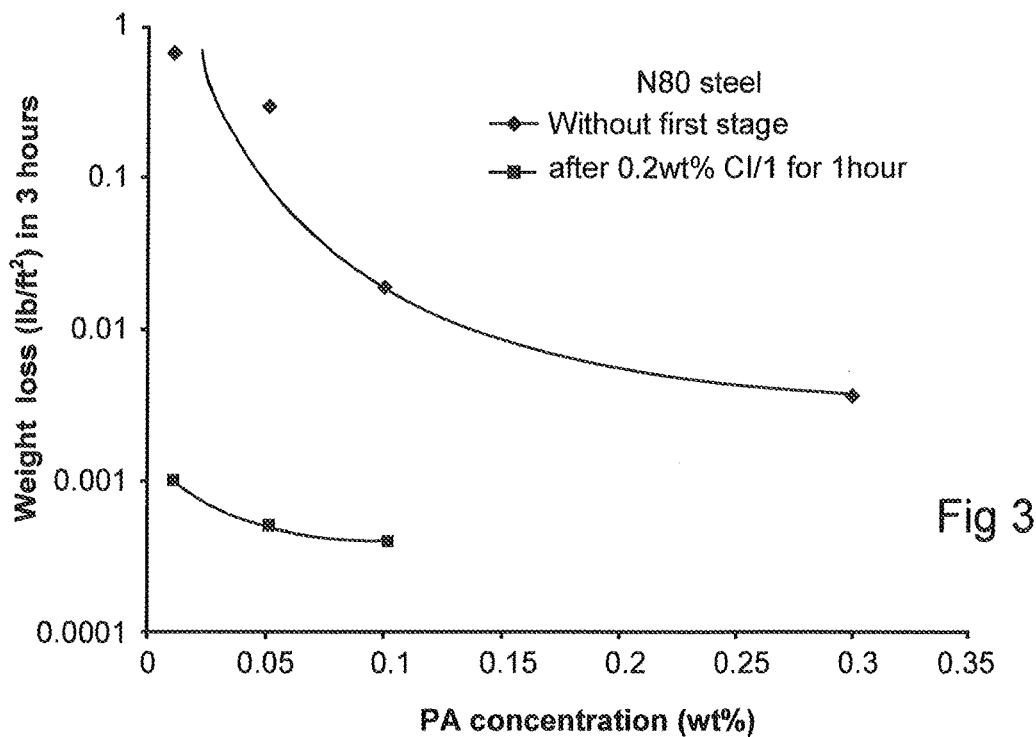
FIG. 3 is a graph showing weight-loss from N80 steel, with and without a first stage of treatment with CI/1, plotted (on a logarithmic scale) against concentration of propargyl alcohol as referred to in Example 8.

As in Example 5, steel coupons were exposed in a first stage of 1 hour to a fluid containing 0.2 wt % CI/1 in 4 molar hydrochloric acid with a weight loss of 0.0014 lb/ft$^2$ (6.8 gm/m$^2$). This was followed by a second stage in which they were exposed to various concentrations of propargyl alcohol in 4 molar hydrochloric acid. These results are also shown in FIG. 3 with the data points shown as squares. It can be seen that the first stage treatment reduced weight loss in the second stage to less than anything achieved without the pre-treatment.

The results are also given in the following table

TABLE 8

| | | Second stage (3 hours) | | | |
|---|---|---|---|---|---|
| | | Propargyl | Weight loss | | |
| | First stage (1 hour) | alcohol (wt %) | lbs/ft$^2$ | gm/m$^2$ | Pitting |
| 1 | none | 0.01 | 0.69 | 3374 | |
| 2 | | 0.05 | 0.31 | 1489 | |

TABLE 8-continued

| | | Second stage (3 hours) | | |
|---|---|---|---|---|
| | Propargyl | Weight loss | | |
| First stage (1 hour) | alcohol (wt %) | lbs/ft² | gm/m² | Pitting |
| 3 | 0.10 | 0.019 | 93 | none |
| 4 | 0.30 | 0.0037 | 18 | none |
| 5    0.2 wt % CI/1 in | 0.01 | 0.0010 | 4.9 | none |
| 6    4M HCl | 0.05 | 0.0005 | 2.4 | none |
| 7 | 0.10 | 0.0004 | 2.0 | none |

EXAMPLE 9

Figure 4:
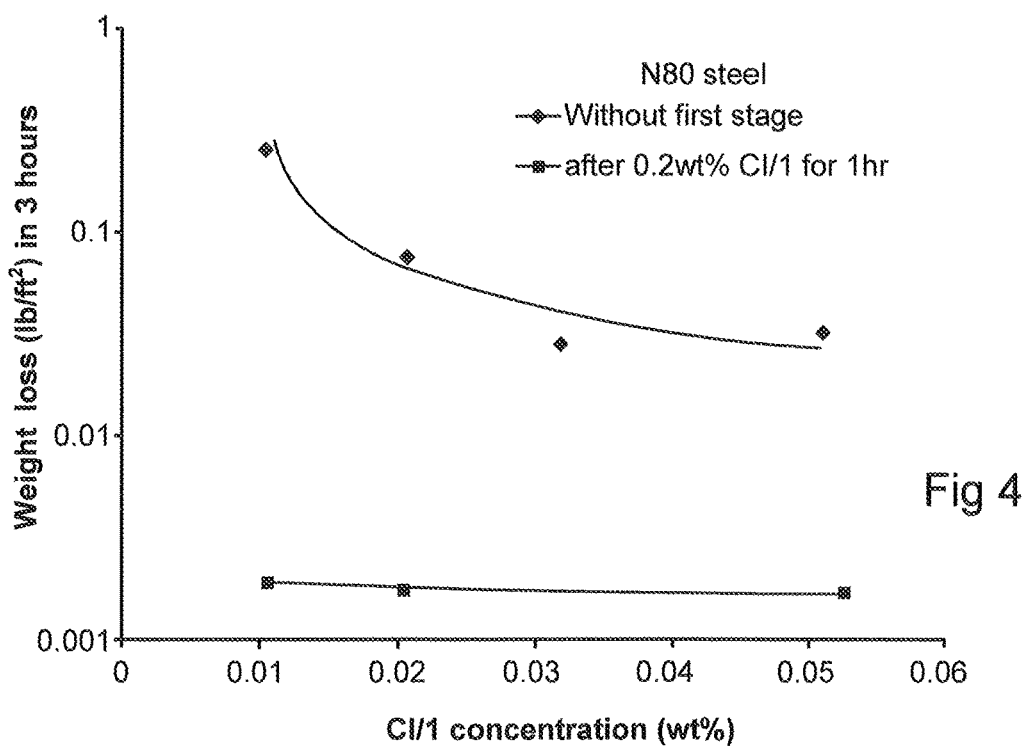
FIG. 4 is a graph showing weight-loss from N80 steel, with and without a first stage of treatment with CI/1, plotted (on a logarithmic scale) against concentration of inhibitor CI/1 as referred to in Example 9.

In this example the steel test pieces were again N80 steel. As in Example 4, steel coupons were exposed for 3 hours (with no preceding first stage) to 4 molar hydrochloric acid containing various concentrations of the CI/1 inhibitor mixture. These results are plotted in FIG. 4 with the data points shown as diamonds.

Following the procedure in Example 7, steel coupons were also exposed to a fluid containing 0.2 wt % CI/1 in 4 molar hydrochloric acid for a first stage of one hour, with a weight loss of 0.0014 lb/ft² (6.8 gm/m²), followed by a second stage in which they were exposed to various concentrations of CI/1 in 4 molar hydrochloric acid. These results are plotted in FIG. 4 with the data points shown as squares. It can readily be seen that the weight loss during this second stage is very low.

The results are also given in the following table

TABLE 9

| | | Second stage (3 hours) | | |
|---|---|---|---|---|
| | CI/1 | Weight loss | | |
| First stage (1 hour) | (wt %) | lbs/ft² | gm/m² | Pitting |
| 1    none | 0.01 | 0.256 | 125 | |
| 2 | 0.02 | 0.077 | 38 | |
| 3 | 0.03 | 0.028 | 13.6 | none |
| 4 | 0.05 | 0.032 | 15.6 | none |
| 5    0.2 wt % CI/1 in | 0.01 | 0.0019 | 9.3 | none |
| 6    4M HCl | 0.02 | 0.0018 | 8.8 | none |
| 7 | 0.05 | 0.0017 | 8.3 | none |

EXAMPLE 10

The procedure of the preceding Example 9 was repeated using N80 steel with a proprietary corrosion inhibitor composition denoted CI/4 which contained a haloalkyl heteropolycyclic salt, an aromatic aldehyde, a quaternary ammonium compound, an oxyalkylated fatty acid and formic acid.

In the first stage, the N80 steel coupons were exposed to a fluid containing either 0.5 wt % or 1 wt % CI/4 in 4 molar hydrochloric acid for one hour, with a weight loss of 0.001 lbs/ft² (4.9 gm/m²) in both cases. This was followed by a second stage in which the coupons were exposed to various concentrations of CI/4 in 4 molar hydrochloric acid for three hours. Comparative experiments were carried out with no first stage.

Figure 5:
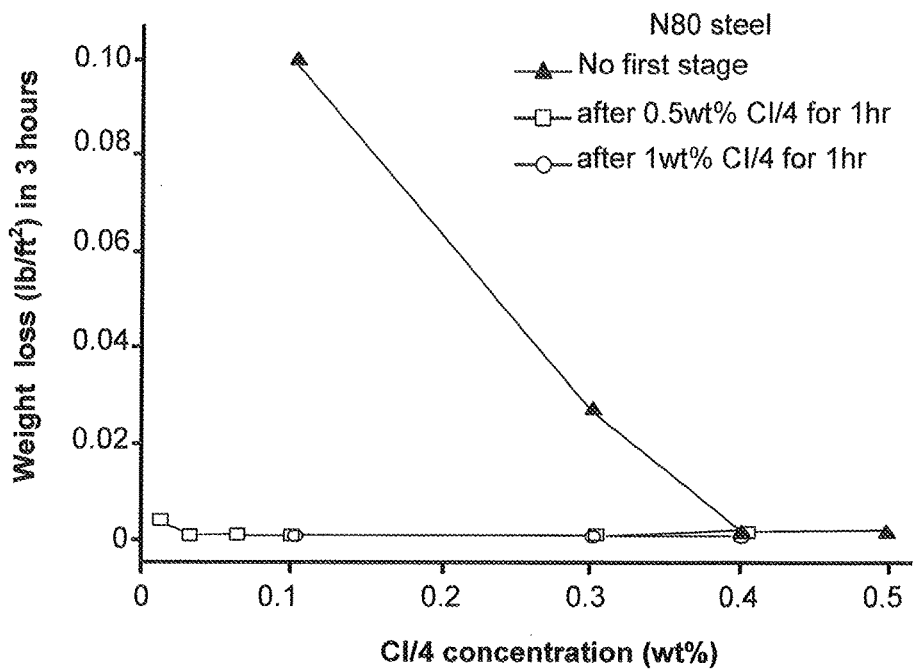
FIG. 5 is a graph showing weight-loss from N80 steel, with and without a first stage of treatment with CI/4, plotted (on a logarithmic scale) against concentration of inhibitor CI/4 as referred to in Example 10.

The results are given in the following table and also shown in FIG. 5. As can be seen, corrosion protection achievable using 0.4 or 0.5 wt % CI/4 throughout was matched or bettered by using 0.5 wt % CI/4 initially and then dropping the concentration of CI/4 to 0.03 wt %.

TABLE 10

| | | Second stage (3 hours) | | |
|---|---|---|---|---|
| | CI/4 | Weight loss | | |
| First stage (1 hour) | (wt %) | lbs/ft² | gm/m² | Pitting |
| 1    none | 0.1 | 0.10 | 488 | |
| 2 | 0.3 | 0.027 | 132 | |
| 3 | 0.4 | 0.0017 | 8.3 | none |
| 4 | 0.5 | 0.0016 | 7.8 | none |
| 5    0.5 wt % CI/4 in | 0.01 | 0.0042 | 20.5 | none |
| 6    4M HCl | 0.03 | 0.0006 | 2.9 | none |
| 7 | 0.06 | 0.0006 | 2.9 | none |
| | 0.1 | 0.0006 | 2.9 | none |
| | 0.3 | 0.0006 | 2.9 | none |
| | 0.4 | 0.0018 | 8.8 | none |
| 1 wt % CI/4 in | 0.1 | 0.0006 | 2.9 | none |
| 4M HCl | 0.3 | 0.0008 | 3.9 | none |
| | 0.4 | 0.0007 | 3.4 | none |

EXAMPLE 11

The procedure of preceding Examples was repeated using N80 steel with two different compositions in the 1 hour first stage followed by using the CI/4 corrosion inhibitor composition at several concentrations in the 3 hour second stage.

One composition, designated CI/5, used in the first stage provided naphthyl methyl quinolinium chloride (NMQCl) which is a water-soluble corrosion inhibitor, 0.34 wt % methyl oleate (MO), which is an oily ester, 0.1 wt %, and water insoluble non-ionic surfactant (NI), 0.5 wt % in 4 molar hydrochloric acid.

Weight loss during this first stage was 0.0079 lbs/ft² (39 gm/m²). Naphthyl methyl quinolinium chloride is a quaternary nitrogen compound and therefore has an organic cation, but it does not form surfactant micelles in water.

An alternative composition used in the first stage was designated CI/5a. It contained the same materials as CI/5 but additionally included cinnamonitrile, so as to provide 0.65 wt % cinnamonitrile in the 4 molar hydrochloric acid. Weight loss during the first stage was 0.0015 lbs/ft² (7.5 gm/m²).

Figure 6:
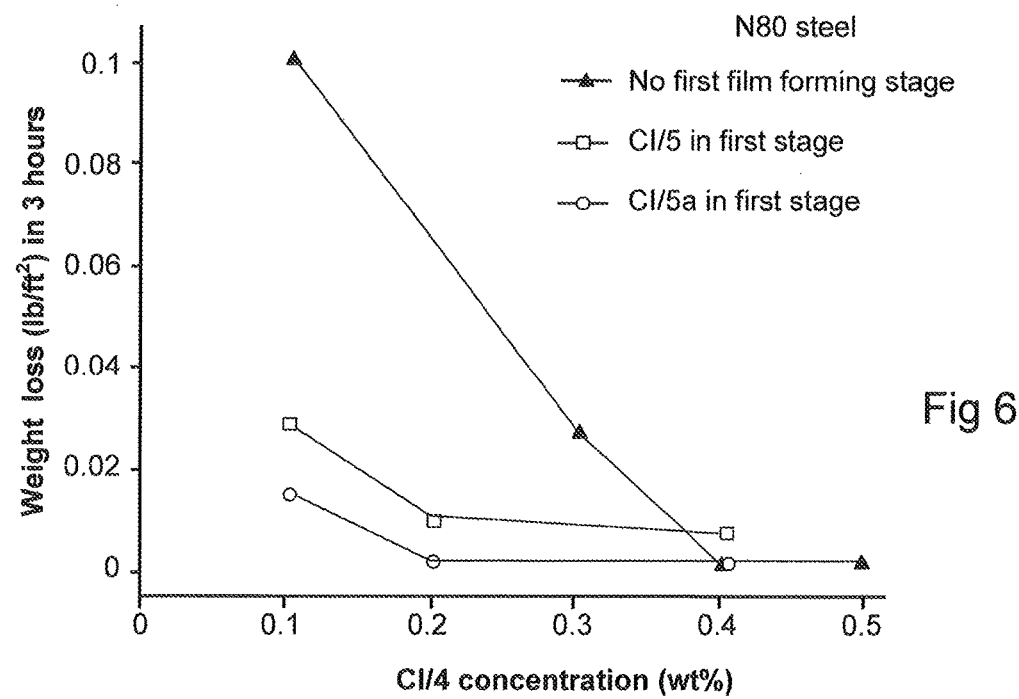
FIG. 6 is a graph showing weight-loss from N80 steel, with and without a first stage of treatment, plotted (on a logarithmic scale) against concentration of inhibitor CI/4 as referred to in Example 11.

As shown by the results set out in the following table and which are also plotted in FIG. 6, both of the first stage treatments made it possible to get low weight loss in the 3 hour second stage with only 0.2 wt % of CI/4. Including cinnammonitrile which has a benzene ring conjugated to an olefinic group and a carbon-nitrogen triple bond improved the effectiveness of the corrosion protecting film deposited in the 1 hour first stage and persisting during the second stage.

TABLE 11

| | | Second stage (3 hours) | | |
|---|---|---|---|---|
| | CI/4 | Weight loss | | |
| First stage (1 hour) | (wt %) | lbs/ft² | gm/m² | Pitting |
| 1    none | 0.1 | 0.10 | 488 | |
| 2 | 0.3 | 0.027 | 132 | |
| 3 | 0.4 | 0.0017 | 8.3 | none |
| 4 | 0.5 | 0.0016 | 7.8 | none |
| 5    CI/5 in 4M HCl | 0.1 | 0.0230 | 112 | none |
| 6 | 0.2 | 0.0041 | 20 | none |
| 7 | 0.4 | 0.0020 | 9.8 | none |
| 8    CI/5a = CI/5 plus | 0.1 | 0.0153 | 75 | none |

TABLE 11-continued

| | | Second stage (3 hours) | | |
|---|---|---|---|---|
| | CI/4 | Weight loss | | |
| First stage (1 hour) | (wt %) | lbs/ft$^2$ | gm/m$^2$ | Pitting |
| 9  0.05 wt % cinnamonitrile | 0.2 | 0.0018 | 8.8 | none |
| 10 in 4M HCl | 0.4 | 0.0018 | 8.8 | none |

Some additional tests were carried out replacing CI/4 in the second stage with either the naphthyl methyl quinolinium chloride alone or a combination of methyl oleate and water insoluble non-ionic surfactant (without naphthyl methyl quinolinium chloride). These tests were carried out using the abovementioned CI/5a combination of materials, including cinnamonitrile, in the first stage and also without a first stage. The results are shown in the following table:

TABLE 12

| | | Second stage (3 hours) | |
|---|---|---|---|
| | | Weight loss | |
| First stage (1 hour) | | lbs/ft$^2$ | gm/m$^2$ |
| None | 11 mM NMQCl | 0.059 | 288 |
| | 0.1 wt % MO + 0.5 wt % NI | 0.3158 | 1542 |
| CI/5a in 4M HCl | 11 mM NMQCl | 0.0037 | 18 |
| | 0.1 wt % MO + 0.5 wt % NI | 0.3241 | 1582 |

These results show that the combination of NMQCl, methyl oleate, surfactant and cinnamonitrile can create a persistent film which can be maintained by NMQCl alone, but it is destabilised by the combination of methyl oleate and non-ionic surfactant.

EXAMPLE 12

In this example the steel test pieces were 13Cr80 steel. As in Examples 1 and 8, steel coupons were exposed for 3 hours (with no preceding first stage) to 4 molar hydrochloric acid containing various concentrations of propargyl alcohol.

As in Example 5, steel coupons were also exposed in a 1 hour first stage to a fluid containing 0.02 wt % CI/1 in 4 molar hydrochloric acid with a weight loss of 0.0012 lb/ft$^2$ (5.9 gm/m$^2$) followed by a second stage in which they were exposed to various concentrations of propargyl alcohol in 4 molar hydrochloric acid.

The results are plotted graphically in FIG. 7 and also given in the following table:

TABLE 13

| | | Second stage (3 hours) | | |
|---|---|---|---|---|
| | Propargyl | Weight loss | | |
| | First stage (1 hour) | alcohol (wt %) | lbs/ft$^2$ | gm/m$^2$ | Pitting |
| 1 | none | 0.005 | 0.78 | 3808 | |
| 2 | | 0.01 | 0.75 | 3613 | |
| 3 | | 0.015 | 0.64 | 3124 | |
| 4 | | 0.02 | 0.53 | 2588 | heavy |
| 5 | | 0.1 | 0.041 | 200 | |
| 6 | | 0.2 | 0.021 | 103 | none |
| 7 | | 0.3 | 0.020 | 97 | none |
| 8 | 0.2 wt % CI/1 in | 0.005 | 0.21 | 1025 | some |
| 9 | 4M HCl | 0.01 | 0.015 | 73 | some |
| 10 | | 0.015 | 0.001 | 4.9 | none |

Figure 7:
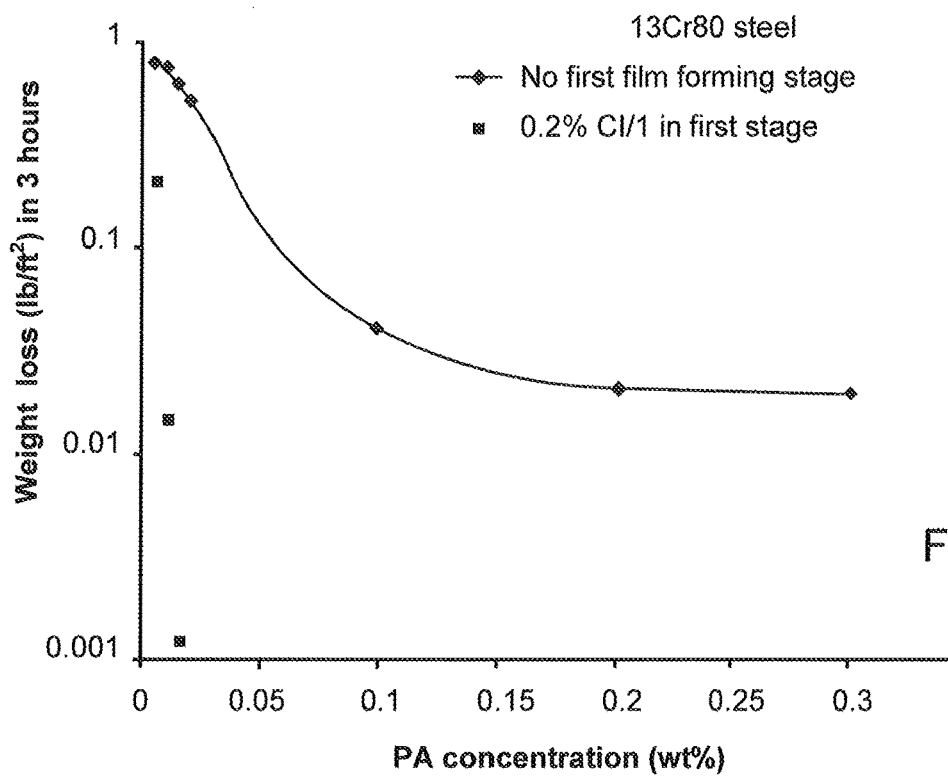
FIG. 7 is a graph showing weight-loss from 13Cr80 steel, with and without a first stage of treatment with CI/1, plotted (on a logarithmic scale) against concentration of propargyl alcohol as referred to in Example 12.

As can be seen from the table and FIG. 7, with no first stage, 0.2 wt % PA in the second stage did inhibit corrosion considerably, but increasing to 0.3 wt % PA had very little additional benefit. By contrast, after the first stage with 0.2 wt % CI/1 to deposit a film, a much lower concentration of PA in the second stage gave a much superior result.

EXAMPLE 13

In this example the steel test pieces were again 13Cr80 steel. As in Example 4, steel coupons were exposed for 3 hours (with no preceding first stage) to 4 molar hydrochloric acid containing various concentrations of the CI/1 inhibitor mixture. As in Example 7, steel coupons were also exposed to a first fluid containing 0.02 wt % CI/1 in 4 molar hydrochloric acid followed by a second stage in which they were exposed to various concentrations of CI/1 in 4 molar hydrochloric acid. The first stage lasted for either 15 minutes or one hour. The second stage was three hours in each case.

The results are plotted graphically in FIG. 8 and are given in the following table:

TABLE 14

| First stage | | | Second stage (3 hours) | | | |
|---|---|---|---|---|---|---|
| | Time | Weight loss | | CI/1 | Weight loss | |
| | (min) | lbs/ft$^2$ | gm/m$^2$ | (wt %) | lbs/ft$^2$ | gm/m$^2$ | Pitting |
| none | 0 | | | 0.01 | 0.08 | 391 | |
| | | | | 0.03 | 0.021 | 103 | none |
| | | | | 0.05 | 0.0048 | 23 | none |
| 0.2 | 60 | 0.0012 | 5.9 | 0.005 | 0.014 | 68 | some |
| wt % | | | | 0.01 | 0.0041 | 20 | none |
| CI/1 in | | | | 0.02 | 0.003 | 14.6 | none |
| 4M HCl | 15 | 0.0007 | 3.4 | 0.005 | 0.032 | 156 | some |
| | | | | 0.01 | 0.018 | 88 | some |
| | | | | 0.02 | 0.0058 | 28 | none |

EXAMPLE 14

A series of tests were carried out exposing HS80 steel coupons to 4 molar hydrochloric acid containing 0.2 wt % propargyl alcohol, as in Example 1, for periods of 1 minute, 5 minutes, 30 minutes and 180 minutes.

The presence of protective films on the coupons was then examined. After exposure, each coupon was washed in deionised water to remove any excess acid. After drying, the coupon was then immersed in 50 mL dichloromethane and the inhibitor film products were extracted into the organic solvent during 30 minutes immersion and agitation in an ultrasonic bath. The dichloromethane solution was then transferred to a 100 mL Petri dish and 3 mL of an aqueous solution of 2 mol/L KBr was added. The dichloromethane and water components were allowed to completely evaporate in a fume hood overnight and subsequently in an oven (T=40° C.) overnight yielding a solid mixture of inhibitor film products and potassium bromide. This residue was then completely removed from the dish, remixed and ground and its infra red spectrum was collected relative to a pure KBr background prepared by the same drying and grinding procedures. Infra-red spectra were determined by Fourier transform infra red spectroscopy.

It was observed that a relatively sharp band in the infra red spectrum of propargyl alcohol due to C—O stretching (1028-1026 cm$^{-1}$) was replaced by a broad band (1300-850 cm$^{-1}$) in the coupon/dichloromethane extracts. This band provides a diagnostic of the polymeric film as its peak area increases systematically with exposure time. This experiment demonstrated a procedure for establishing whether a film is present on a treated coupon. However, the weight loss experiments in Example 2 above show that the protective film which formed in the presence of 0.2 wt % propargyl alcohol did not provide persistent corrosion protection after the concentration of propargyl alcohol was reduced.

Electrochemical Measurements

Examples below made use of electrochemical measurements carried out in a corrosion cell which was a 0.5 liter glass container surrounded by a thermostatic water-jacket to maintain temperature at 78 C. The container's glass top was fitted with a number of items projecting into the liquid in the container. These were a Metrohm Ag/AgCl (3M KCl) reference electrode, a graphite counter electrode, a thermometer and a gas two-way purge tube. A fine Luggin capillary was placed close to the working electrode to minimize ohmic resistance effects. Magnetic stirring was used to provide an even temperature distribution and good mixing during each experiment.

Each test was carried out using a static working electrode which consisted of 1.4 mm thick, 16 mm diameter, flat, circular HS80 steel disk with exposed surface area of 1.0 cm². No crevice corrosion was observed under the Teflon o-ring used to mount the disk in a holder. The liquid in the container was de-aerated by bubbling nitrogen through it for 30 minutes prior to each test and throughout the experiment.

An Autolab PGSTAT 302N Potentiostat combined with Autolab MUX Multi4 multiplexer was used to apply potential to the electrodes and record current flow.

Linear polarization resistance (LPR) measurements were carried out in a potential range ±5 mV with respect to the open circuit potential (OCP) and at a scan rate of 0.2 mV/s. The polarization resistance ($R_P$) was determined from the slope of the potential versus the current line. The Tafel slopes, $\beta_a$ and $\beta_c$, were determined from potentiodynamic polarization tests. The polarization resistance was used to calculate the corrosion current using the Stern-Geary equation:

$$I_{corr} = ((\beta_a \times \beta_c)/(2.303(\beta_a + \beta_c))) \times 1/R_p$$

The corrosion current was converted to weight loss using Faraday's law. For corrosion of steel, a corrosion current of 1 mA cm$^{-2}$ approximates to a corrosion rate of 11.6 mm per year.

EXAMPLE 15

Figure 9:
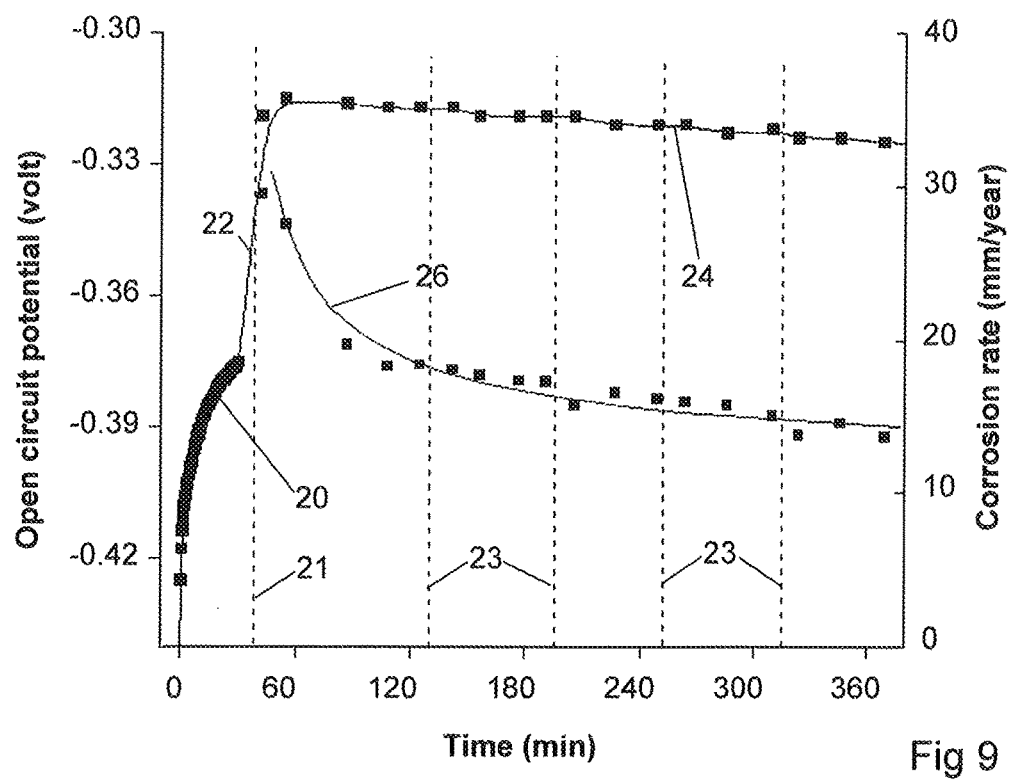
FIG. 9 shows the results of an electrochemical experiment described in Example 15.

The working electrode was a 1 cm² disc of HS80 steel. Initially this was exposed in the corrosion cell to 4 molar hydrochloric acid which did not contain any corrosion inhibitor. During an initial 40 min period of equilibration, the open circuit potential reached a near-steady state value around −0.375 volt. This is shown by curve 20 in FIG. 9 in which open circuit potential is indicated on the left-hand axis. After 40 minutes, as indicated by dashed line 21, some CI/1 corrosion inhibiting mixture was then introduced to give a concentration of 0.2 wt %. The open circuit potential rose rapidly to −0.315 volt as shown by the continuation 22 of curve 20.

During the exposure to this concentration of CI/1, the corrosion rate, indicated by curve 26 fell progressively. This was attributed to the formation of an inhibitor film on the steel test piece.

The 4 molar hydrochloric acid was replaced four times at intervals indicated by dashed lines 23, reducing the concentration of corrosion inhibitor each time as set out in the following table:

| Elapsed time (minutes) | CI/1 concentration (wt %) |
| --- | --- |
| 40 | 0.2% |
| 130 | 0.13% |
| 200 | 0.087% |
| 250 | 0.057% |
| 320 | 0.038% |

As shown by slope 24, these four successive decreases in the concentration of CI/1 in the acid led to only a small reduction in open circuit potential and did not result in an increase in the instantaneous corrosion rate. On the contrary, the corrosion rate decreased from 17 to 14 mm/yr. Thus, it can be seen that the efficacy of the corrosion inhibiting film established by 0.2 wt % CI/1 was maintained for a total of 4 hours by successively lower concentrations of CI/1.

EXAMPLE 16

Figure 10:
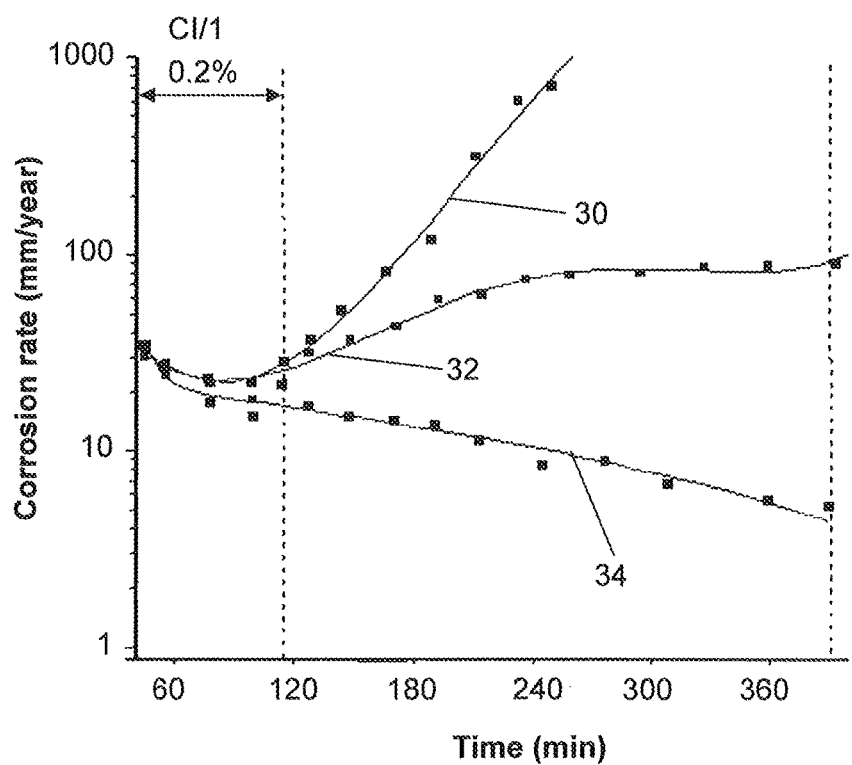
FIGS. 10 and 11 show the results of electrochemical experiments described in Examples 16 and 17.

In each experiment the working electrode was a disc of HS80 steel as in the previous example. This steel electrode was first exposed to 4 molar hydrochloric acid containing 0.2 wt % CI/1 inhibitor mixture for a period of 110 min. LPR was measured at intervals and used to calculate the corrosion rate which is plotted in FIG. 10. After 110 min, indicated in FIG. 10 by a dotted vertical line, the acid in the corrosion cell was replaced with fresh 4 molar hydrochloric acid. LPR measurements were continued and used to calculate corrosion rates.

Figure 8:
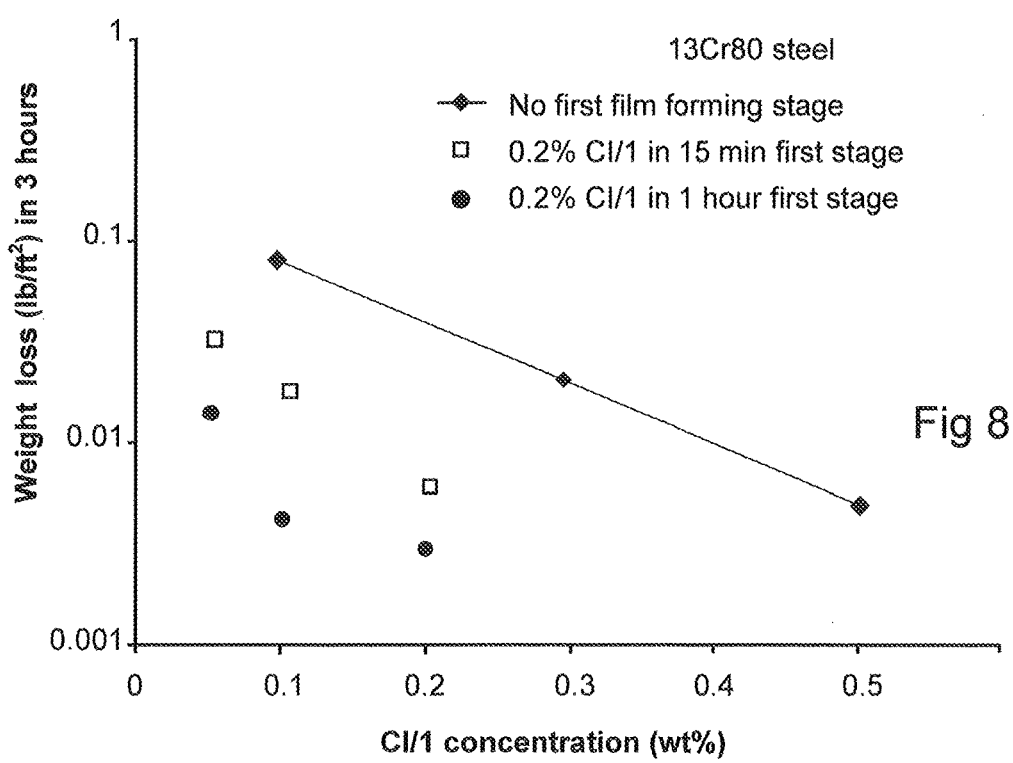
FIG. 8 is a graph showing weight-loss from 13Cr80 steel, with and without a first stage of treatment with CI/1 for 15 minutes or 1 hour, plotted (on a logarithmic scale) against concentration of inhibitor CI/1, as referred to in Example 13.

In one experiment this replacement acid contained no corrosion inhibitor and the corrosion rate rose progressively as shown by curve 30 in FIG. 8. In the second experiment the replacement acid contained CI/1 corrosion inhibitor at a concentration of 0.0036 wt % and the corrosion rate calculated from LPR measurements is shown by curve 32. It can be seen that the corrosion rate rose somewhat, but then reached an almost constant plateau value. This was a low rate of about 90 mm/yr—equivalent to a weight loss of 0.05 lb/ft² in 3 hours, even though the concentration of CI/1 was much lower than the 0.2 wt % used initially.

In the third experiment the replacement acid contained 0.01 wt % of the CI/1 mixture. The corrosion rate is shown by curve 34 and it can be seen that the corrosion rate continued to fall. This shows that a corrosion inhibiting film established with 0.2 wt % CI/1 was not only maintained by the lower concentration of 0.01 wt % but became more efficacious.

EXAMPLE 17

Figure 11:
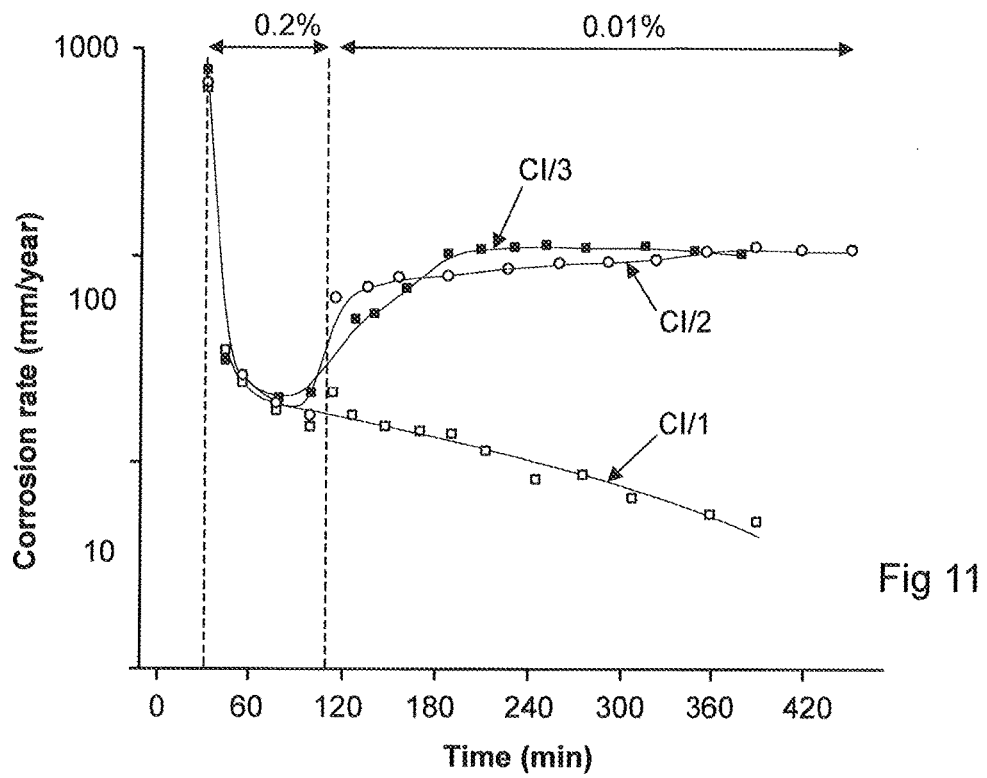

The procedure was similar to that of the previous example. LPR measurements at intervals were used to calculate corrosion rates which are plotted in FIG. 11. Three different corrosion inhibitor mixtures were used, including the CI/1 mixture referred to above. These mixtures contained:

CI/1: 7% propargyl alcohol, 60% hydrocarbon (oily phase), 33% methanol

CI/2: 7.5% propargyl alcohol, 3% 4-ethyl 1-octyn-3-ol, 15% alkyl quaternary ammonium surfactants, 6% nonionic surfactant, 7.5% hydrocarbon, 61% water-soluble organic solvents CI/3: 11% ∞-alkenylphenones, 24% haloalkyl heteropolycyclic salt, 27% formic acid, 10% non-ionic surfactant, balance is a mixture of water and water-soluble organic solvents.

For each experiment there was an initial equilibration in 4 molar hydrochloric acid without any corrosion inhibitor. After 30 minutes one of the corrosion inhibitor mixtures was added to give a concentration of 0.2 wt % for a further 80 min after which the acid was replaced with more 4 molar hydrochloric acid containing the same corrosion inhibitor at a concentration of 0.01 wt %.

The corrosion rates during exposure to 0.2 wt % CI/1, 0.2 wt % CI/2 and 0.2 wt % CI/3 were similar. When the acid was replaced to reduce the inhibitor concentration to 0.01 wt %, the corrosion rates with CI/2 and CI/3 rose but reached a steady plateau value which is a corrosion rate of about 90 mm/year. With CI/1 the result was even better, because the corrosion rate continued to fall.

EXAMPLE 18

Electrochemical measurements akin to those in Example 15 were carried out using a rotating cylinder electrode of HS80 steel. This had an outside diameter of 1.5 cm and calculations showed that when the electrode was turned at 6000 rpm, the wall shear stress was 50 kPa which is similar to the wall shear stress in coiled tubing with a 1 inch (2.5 cm) internal diameter when there is a flow rate of 1 bbl/min through it. Calculation of Reynolds number showed that flow adjacent to the rotating electrode was turbulent when the electrode was rotating at this speed.

Figure 12:
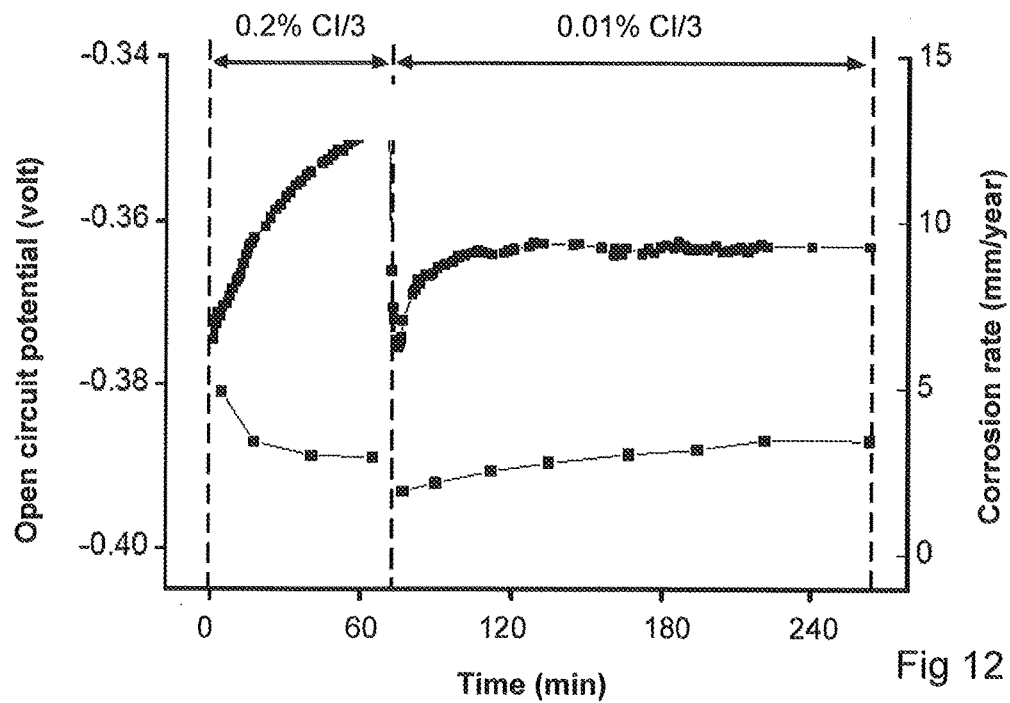
FIG. 12 shows the results of an electrochemical experiment with a rotating cylinder electrode, using inhibitors CI/1, CI/2 and CI/3, as described in Example 18.

Experiments were carried out using the CI/3 corrosion inhibitor mixture mentioned above. In a first stage of slightly over 1 hour, the electrode was exposed to 4 molar hydrochloric acid at 78° C. containing 0.2 wt % CI/3 while rotating at 6000 rpm. As shown in FIG. 12, the open circuit potential rose from −0.375 volt to −0.35 volt during this time. In a three hour second stage the cylinder was exposed to the same strength acid containing 0.01 wt % CI/3. Open circuit potential and linear polarisation resistance (LPR) measurements were continued and the measurements of LPR were used to calculate the rate of corrosion. As can be seen at the right hand portion of FIG. 12 the corrosion rate remained low, showing once again that a corrosion protecting film is established in the first stage and remains effective in the second stage.

EXAMPLE 19

Figure 13:
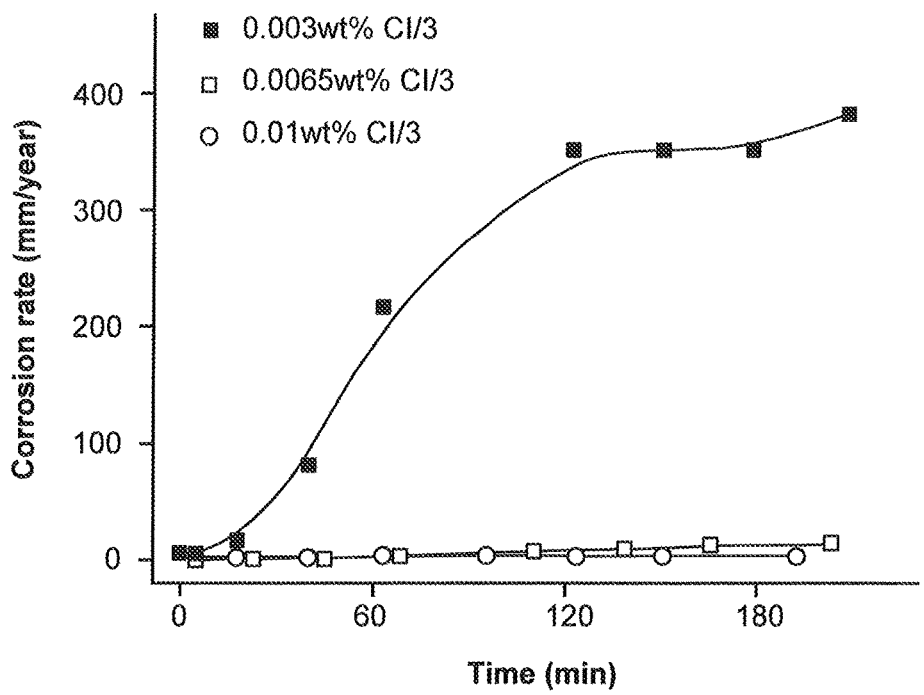
FIG. 13 shows the results of a similar experiment, as described in Example 19.

The procedure of the previous example was followed. In the second stage the acid contained CI/3 at different concentrations in three separate experiments. The results from the second stage are shown in FIG. 13. It is apparent that the concentration of 0.0065 wt % was sufficient to maintain the protective film established in the first stage, but the lower concentration of 0.003 wt % was not sufficient to do this.

EXAMPLE 20

Further experiments were carried out using a rotating cylinder electrode made of HS80 steel in procedures similar to those of Example 18. The CI/1 corrosion inhibitor mentioned above was used.

Figure 14:
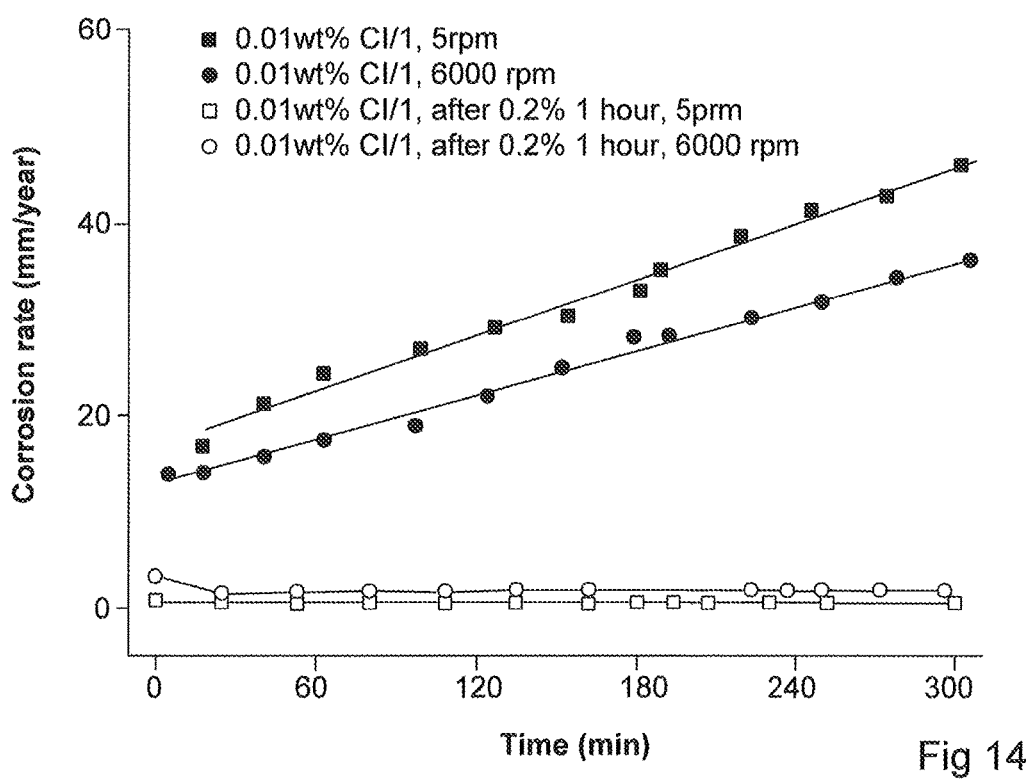
FIG. 14 shows the results of a further electrochemical experiment with a rotating cylinder electrode, as described in Example 20.

In a first stage of 1 hour, the electrode was exposed to 4 molar hydrochloric acid at 78° C. containing 0.2 wt % CI/1 while rotating at 6000 rpm so that flow adjacent the electrode was turbulent as mentioned in Example 18. In a three hour second stage the cylinder was exposed to the same strength acid containing 0.01 wt % CI/1 while rotating at the same speed of 6000 rpm. Linear polarisation resistance (LPR) measurements were made and used to calculate the rate of corrosion, which is shown graphically in FIG. 14. Another experiment was similar, except that the electrode was rotated at only 5 rom. Calculation of Reynolds number showed that flow adjacent to the electrode was laminar. The results are shown in FIG. 14. In comparative experiments the first stage using 0.2 wt % CI/1 was omitted.

As can be seen from FIG. 14, with both linear and turbulent flow, a corrosion protecting film is established in the first stage and remains effective in the second stage, so that the corrosion rate observed in the second stage is low.

EXAMPLE 21

Experiments similar to those in Examples 5 and 7 were carried out at a temperature of 121° C. and pressure of 3000 psi (20.7 MPa) representing conditions which might be encountered downhole in a wellbore.

Figure 15:
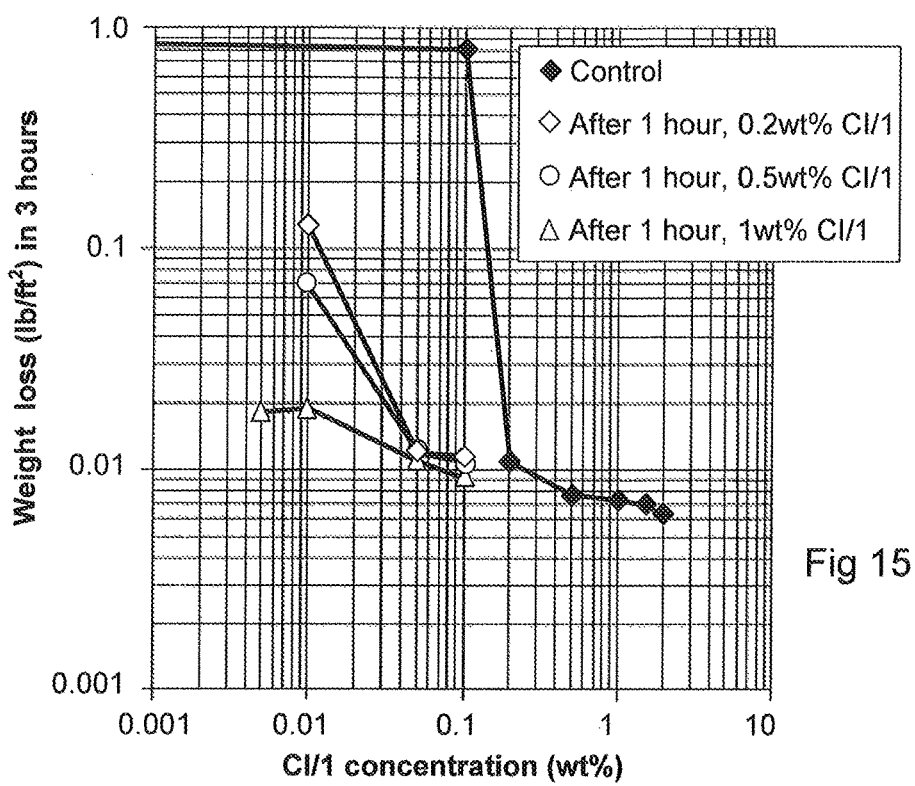
FIG. 15 is a set of graphs (on logarithmic scales) showing weight-loss from HS80 steel, with and without a first stage of treatment with CI/1, plotted against concentration of inhibitor CI/1, at higher temperature and pressure, as referred to in Example 21.

Coupons of HS 80 steel were exposed to 15 wt % (4.1 Molar) hydrochloric acid for an initial period of one hour. During this initial period the acid contained 0.2, 0.5 or 1 wt % CI/1 inhibitor. Then in a second stage at the same temperature and pressure the coupons were exposed to 15 wt % hydrochloric acid containing various concentrations of CI/1 inhibitor. Weight loss was determined after three hours. Results are shown in FIG. 15 as plots of weight loss in the second stage against the concentration of CI/1 inhibitor in the second stage. This Figure also shows weight-loss in control experiments in which initial period was omitted. As can be seen from FIG. 15, the formation of an initial film in the first stage led to a considerable reduction in corrosion in the second stage compared to the control, with CI/1 concentrations of 0.1 wt % and below in the second stage.

Thus the protective effect of an initial period with a relatively raised concentration of corrosion inhibitor, prior to longer exposure at a lower concentration of corrosion inhibitor was observed at the higher temperature used in these experiments. As shown by these results it was beneficial to use a greater concentration of CI/1 during the initial period than was used in the initial period in Examples 5 and 7 where the temperature was 80° C.

EXAMPLE 22

Figure 16:
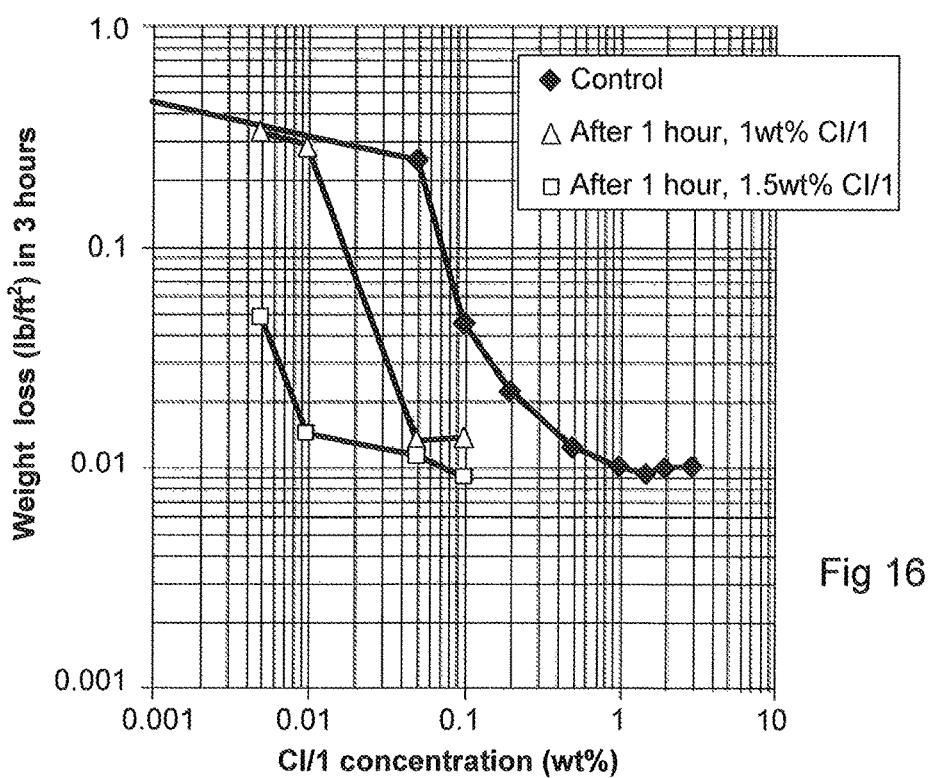
FIG. 16 is a corresponding set of graphs (on logarithmic scales) showing weight-loss from N80 steel, with and without a first stage of treatment with CI/1, plotted against concentration of inhibitor CI/1 at higher temperature and pressure as referred to in Example 22.

The procedure of Example 21 was repeated using coupons of N80 steel. The results are plotted in FIG. 16. Concentrations of 1 wt % and 1.5 wt % CI/1 were used in the initial period. As can be seen from FIG. 16, the formation of an initial film in the first stage again led to a considerable reduction in corrosion in the second stage compared to the control, with CI/1 concentrations of 0.1 wt % and below in the second stage.

Figure 17:
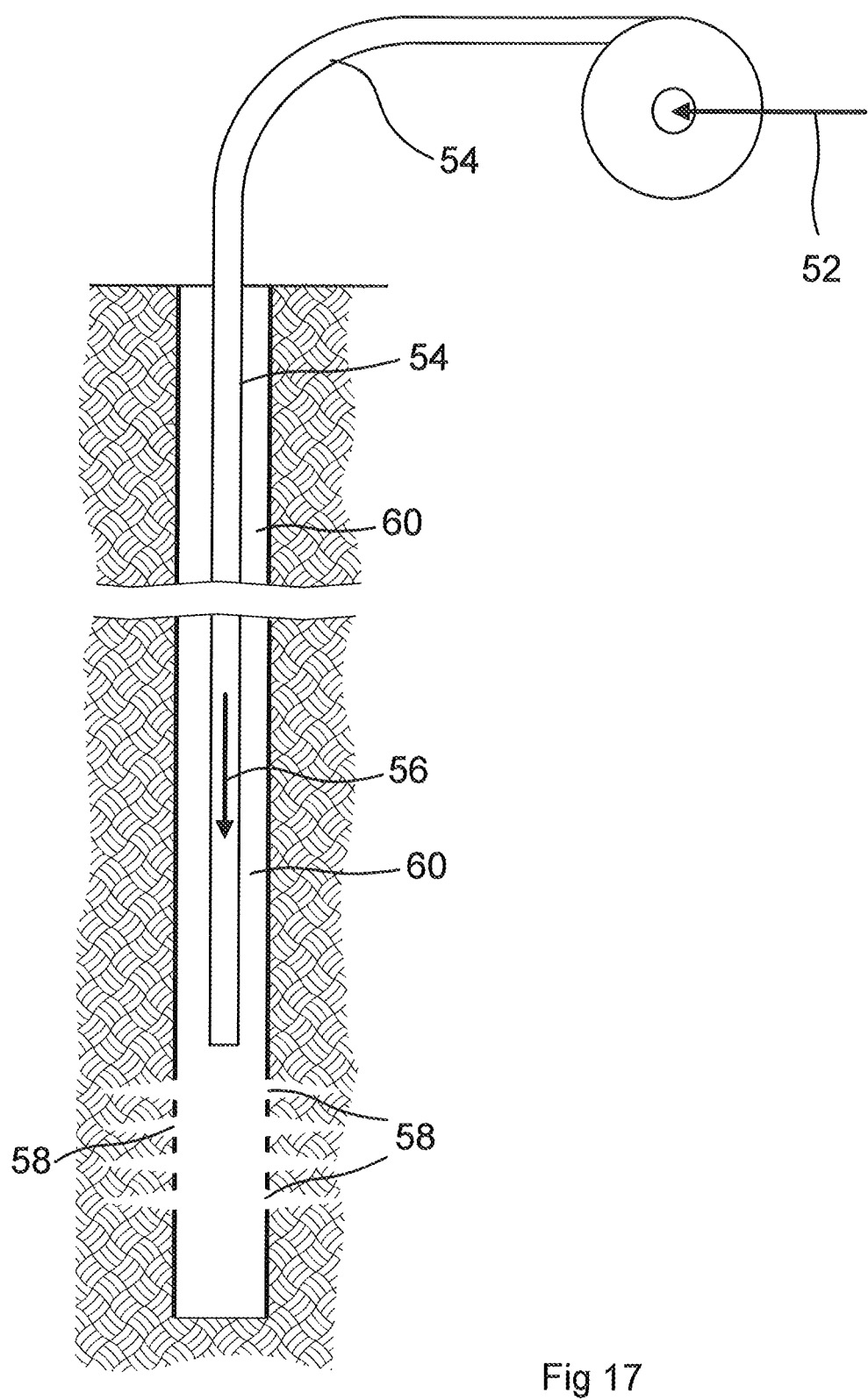
FIG. 17 shows diagrammatically the use of coiled tubing in a matrix acidizing job.

FIG. 17 shows coiled tubing in use for matrix acidizing. Coiled tubing 54 is inserted into a wellbore so as to extend down the well to the vicinity of perforations 58 which extend through the well casing into the surrounding rock formation.

Illustration 1. The coiled tubing 54 is made of HS80 steel. It has length of 3000 meters and internal diameter of 3 cm, so that it has an internal volume of 13.34 bbl (2121 liters). 4 molar hydrochloric acid containing 0.2 wt % CI/1 is pumped into the upper end of the tubing, as shown by arrow 52 at a rate of 1 bbl/minute for 15 minutes. Thus the 15 bbl (2385 liters) of acid which is pumped in is slightly more than the tubing volume. This is followed by the main acid stage in which acid is pumped down the tubing 54 as indicated by arrow 56 to flow out through the perforations 58 into the surrounding formation. In this stage the acid is 4 molar hydrochloric containing 0.01 wt % propargyl alcohol, and it is pumped at 5 bbl/minute (795 liters/min) for 3 hours.

The amounts of materials and the weight loss (predicted from figures in Example 5 above and therefore assuming a temperature of 80° C.) are calculated as:

First stage: 1 bbl/min (159 L/min) of 4M HCl containing 0.2 wt % CI/1, pump time 15 min
  Total volume=15 bbl (2385 L) which is >1 tubing volume
  Total inhibitor (at 2 g/L)=4.77 kg
  First stage weight loss=0.0006 lb/ft$^2$ (2.9 gm/m$^2$)
Main acid stage: 5 bbl/min (795 L/min) of 4M HCl containing 0.01 wt % propargyl alcohol, pump time 3 hours
  Total volume=900 bbl (143100 L) which is >67 tubing volumes
  Total propargyl alcohol (at 0.1 g/L)=14.301 kg
  Main acid stage weight loss=0.0011 lb/ft$^2$ (5.4 gm/m$^2$)
Total inhibitor=4.77 kg CI/1 and 14.3 Kg of propargyl alcohol
Total weight loss=0.0017 lb/ft$^2$ (8.3 gm/m$^2$)

By contrast a conventional approach would use over 28 Kg of inhibitor by adding 0.02 wt % CI/1 or 0.02 wt % propargyl alcohol to all the acid in expectation of a weight loss of no more than 0.05 lb/ft$^2$ (244 gm/m$^2$). Thus the conventional approach uses more inhibitor to keep the weight loss down to a value which is many times higher than that low loss of weight achieved by the two stage approach above.

Illustration 2

The coiled tubing 54 is made of HS80 steel. It has length of 6000 meters and internal diameter of 3 cm, so that it has an internal volume of 26.68 bbl (4242 liters).

The first stage is carried out using 4 molar hydrochloric acid containing 0.2 wt % CI/1 pumped at 0.5 bbl per minute (79.5 liters/min) for 1 hour. The main acid stage is then carried out using 4 molar acid containing 0.005 wt % propargyl alcohol pumped at 3 bbl/minute (477 liters/min) for 6 hours. The amounts of materials and the weight loss (predicted from figures in Example 5 above) are calculated as:

First stage: 0.5 bbl/min (79.5 L/min) of 4M HCl containing 0.2 wt % CI/1, pump time 1 hour
  Total volume=30 bbl (4770 L) which is >1 tubing volume
  Total inhibitor (at 2 g/L)=9.53 kg
  First stage weight loss=0.0011 lb/ft$^2$
Main acid stage: 3 bbl/min (477 L/min) of 4M HCl containing 0.005 wt % propargyl alcohol, pump time 6 hours
  Total volume=1080 bbl (171720 L) which is >40 tubing volumes
  Total propargyl alcohol (at 0.05 g/L)=8.58 kg
  Main stage weight loss=0.0014 lb/ft$^2$ (6.8 gm/m$^2$)
Total Weight Loss=0.0025 lb/ft$^2$ (12.2 gm/m$^2$)

By contrast in a conventional approach pumping 3 bbl/min (477 L/min) of 4M HCl containing 0.02-0.03 wt % CI/1 or 0.02-0.03 wt % propargyl alcohol for 6 hours
  Total volume=1080 bbl (171720 liters which is >40 tubing volumes)
  Total CI/1 or propargyl alcohol (at 0.2-0.3 g/L)=34.32-51.48 kg
  Total Weight Loss=0.05 lb/ft$^2$ (244 gm/m$^2$)

The conventional approach uses much more inhibitor to keep weight loss down to a value which is 20 times higher than that achieved by the two stage approach.

Using the conventional approach, a CI/1 concentration of ≥0.06 wt % (total quantity 102.96 kg) would be required to reduce the weight loss to 0.01 lb/ft$^2$ (49 gm/m$^2$). The latter weight loss is still 4 times higher than the weight loss achieved by the two stage approach.

Illustration 3.

It is assumed that there will be exposure to temperatures of 120° C. The coiled tubing 54 is made of HS80 steel. It has length of 4877 meters (16,000 ft) and internal diameter of 3.5 cm (1.4 inch), so that it has an internal volume of 30.5 bbl (4850 liters). One tubing volume of 15 wt % hydrochloric acid containing 1.0 wt % CI/1 is pumped into the upper end of the tubing as the tubing is inserted into a borehole. In the subsequent main acid stage, the acid pumped down the tubing 54 is 15 wt % hydrochloric acid containing 0.05 wt % CI/1. It is pumped at 2 bbl/minute (795 liters/min) for 3 hours, so that 360 bbl (57240 L) is pumped.

The amounts of materials and the weight loss (predicted from FIG. 15) are calculated as:

First stage:
  Volume=30.5 bbl (4850 L) which is 1 tubing volume
  CI/1 inhibitor (at 10 g/L)=48.5 Kg
  Weight loss approx. 0.001 lb/ft$^2$
Main acid stage:
  Total volume=360 bbl (57240 L)
  CI/1 inhibitor (at 0.5 g/L)=28.5 Kg
  Weight loss 0.011 lb/ft$^2$
Overall total CI/1 inhibitor=77 Kg CI/1
Overall weight loss 0.012 lb/ft$^2$ By contrast, using a constant 0.15 wt % CI/1 while pumping 360 bbl (57240 L) would use 86 Kg of CI/1 inhibitor and total weight loss would be inferior, at around 0.04 lb/ft$^2$.

If the steel was N80, the first stage could also be carried out with 1 wt % CI/1 in one tubing volume of acid and 0.05 wt % CI/1 in the acid of the main stage so that the total amount of inhibitor would be 77 Kg and the weight loss would be about 0.013 lb/ft$^2$. By contrast using at least 0.5 wt % CI/1 while pumping 360 bbl (57240 L) would use 286 Kg of CI/1 inhibitor and weight loss would be the same.

At the end of the main pumping stage, spent acid from the formation is conventionally allowed to flow back to the surface, flowing up the annulus 60 around the coiled tubing. This exposes the well casing and the exterior of the coiled tubing to acid. In a further development of the procedures illustrated above, several tubing volumes of acid containing 0.2 wt % CI/1 are pumped in at the end of the main stage. This acid which contains the higher concentration of inhibitor leads the flow back to the surface, thus contacting the exterior of the coiled tubing and the well casing with a concentration of inhibitor mixture which is quantitatively and qualitatively able to create a persistent film at the beginning of the flow back period.

It is also possible that matrix acidizing could be carried out without using coiled tubing, and pumping the acid directly into the wellbore tubing. In this event the first stage would place a protective film on the wellbore tubing before the main stage in which acid is pumped through the wellbore to flow out into the formation. Materials and concentrations might be similar to those in the illustrations above, although with a larger volume in the first stage to match the volume of the wellbore.

It will be appreciated that the example embodiments described in detail above can be modified and varied within the scope of the concepts which they exemplify. Features referred to above or shown in individual embodiments above may be used together in any combination as well as those which have been shown and described specifically. Accordingly, all such modifications are intended to be included within the scope of this disclosure as defined in the following claims.

The invention claimed is:

1. A method of inhibiting corrosion of steel by aqueous acidic solution when the steel is exposed to aqueous acidic solution in the course of acidic treatment of a wellbore, the method comprising:
during a first period of time, carrying out a preliminary treatment by exposing the steel to a first aqueous solution containing one or more corrosion inhibiting constituents selected from corrosion inhibitors able to adsorb to a steel surface and water-insoluble hydrophobic materials, wherein the one or more corrosion inhibiting constituents provide both a corrosion inhibitor and a hydrophobic liquid and deposit a corrosion inhibiting film on the steel surface; and
during a second period of time after the first period of time, exposing the steel to an acidic second aqueous solution also containing one or more corrosion inhibiting constituents selected from corrosion inhibitors able to adsorb to the steel surface and water-insoluble hydrophobic materials;
wherein a concentration of the corrosion inhibiting constituents in the acidic second aqueous solution is less than a concentration of the corrosion inhibiting constituents in the first aqueous solution; and
wherein the concentration of the corrosion inhibiting constituents in the acidic second aqueous solution maintains the film on the steel surface such that a weight loss through corrosion in the second period of time is lower than a weight loss which would be observed with the same acidic second aqueous solution but without carrying out the preliminary treatment.

2. The method of claim 1, wherein the acidic second aqueous solution contains the corrosion inhibitor able to adsorb to the steel surface, and a concentration of the corrosion inhibitor able to adsorb to the steel surface in the acidic second aqueous solution is less than a concentration of the corrosion inhibitor able to adsorb to the steel surface in the first aqueous solution.

3. The method of claim 1, wherein the first aqueous solution contains at least one corrosion inhibitor which is polymerisable on the steel surface.

4. The method of claim 3, wherein the corrosion inhibitor which is polymerisable on the steel surface is an acetylenic alcohol.

5. The method of claim 1, wherein the water-insoluble hydrophobic materials are selected from water-insoluble amines, cationic surfactants, and water-insoluble hydrophobic liquids.

6. The method of claim 1, wherein the corrosion inhibitor and the hydrophobic liquid in the first aqueous solution are provided by at least one corrosion inhibitor which is able to adsorb to the steel surface and which is a water-insoluble hydrophobic liquid.

7. The method of claim 1, wherein the corrosion inhibiting constituents in the first aqueous solution comprise at least one corrosion inhibitor able to adsorb to the steel surface and a separate water-insoluble hydrophobic oil.

8. The method of claim 7, wherein the oil is a hydrocarbon or an ester.

9. The method of claim 1, wherein the corrosion inhibiting constituents in the first aqueous solution comprise:
2 to 25 wt % of at least one corrosion inhibitor able to chemisorb to a steel surface;
0 to 10% of water-insoluble cationic surfactant; and
15 to 98 wt % of uncharged water-insoluble hydrophobic oil.

10. The method of claim 1, wherein the concentration of the corrosion inhibiting constituents in the first aqueous solution is at least 0.1 wt % but not more than 10 wt %.

11. The method of claim 1, wherein the concentration of the corrosion inhibiting constituents in the acidic second aqueous solution is not more than half the concentration of the corrosion inhibiting constituents in the first aqueous solution.

12. The method of claim 1, wherein the first period of time is not more than one hour and the second period of time is at least three times as long as the first period of time.

13. The method of claim 1, wherein the first aqueous solution and the acidic second aqueous solution are both pumped through steel coiled tubing inserted into a wellbore.

14. The method of claim 13, further comprising:
during a third period of time after the second period of time, pumping through the coiled tubing a third aqueous solution also containing one or more corrosion inhibiting constituents selected from corrosion inhibitors able to adsorb to the steel surface and water-insoluble hydrophobic materials;
wherein a concentration of the corrosion inhibiting constituents in the third aqueous solution is greater than a concentration of the corrosion inhibiting constituents in the acidic second aqueous solution.

15. A method of inhibiting corrosion of steel by aqueous acidic solution when the steel is exposed to aqueous acidic solution in the course of acidic treatment of a wellbore, the method comprising:
during a first period of time, carrying out a preliminary treatment by exposing the steel to a first aqueous solution containing one or more corrosion inhibiting constituents selected from the group consisting of corrosion inhibitors able to adsorb to a steel surface, water-insoluble amines, cationic surfactants, non-ionic surfactants, and water-insoluble hydrophobic liquids, wherein the corrosion inhibiting constituents provide at least a corrosion inhibitor and a hydrophobic liquid and deposit a corrosion inhibiting film on the steel surface; and
during a second period of time after the first period of time, exposing the steel to an acidic second aqueous solution containing one or more corrosion inhibiting constituents selected from the group;
wherein the acidic second aqueous solution contains a concentration of corrosion inhibiting constituents from the group which is less than a concentration of corrosion inhibiting constituents in the first aqueous solution; and
wherein the concentration of corrosion inhibiting constituents in the acidic second aqueous solution maintains the film on the steel surface such that a weight loss through corrosion in the second period of time is lower than a weight loss which would be observed with the same acidic second aqueous solution but without carrying out the preliminary treatment.

16. The method of claim 15, wherein the acidic second aqueous solution contains the corrosion inhibitor able to adsorb to the steel surface, and a concentration of the corrosion inhibitor able to adsorb to the steel surface in the acidic second aqueous solution is less than a concentration of the corrosion inhibitor able to adsorb to the steel surface in the first aqueous solution.

17. The method of claim 15, wherein the corrosion inhibiting constituents in the preliminary treatment comprise at least one corrosion inhibitor able to adsorb to the steel surface and also at least one water insoluble cationic surfactant.

18. The method of claim 15, wherein the at least one corrosion inhibitor able to adsorb to the steel surface are selected from compounds with aromatic groups and compounds with triple bonds.

19. The method of claim 15, wherein the concentration of the corrosion inhibiting constituents in the first aqueous solution is at least 0.1 wt % but not more than 10 wt %.

20. The method of claim 15, wherein the concentration of the corrosion inhibiting constituents in the acidic second aqueous solution is not more than half the concentration of the corrosion inhibiting constituents in the first aqueous solution.

21. The method according to of claim 15, wherein the first aqueous solution and the acidic second aqueous solution are both pumped through steel coiled tubing inserted into a wellbore.

22. The method of claim 21, further comprising:
during a third period of time after the second period of time, pumping through the coiled tubing an acidic third aqueous solution also containing one or more corrosion inhibiting constituents selected from the group;
wherein a concentration of the corrosion inhibiting constituents in the acidic third aqueous solution is greater than a concentration of the corrosion inhibiting constituents in the acidic second aqueous solution.

* * * * *